(12) United States Patent
Murasawa et al.

(10) Patent No.: US 9,716,809 B2
(45) Date of Patent: Jul. 25, 2017

(54) IMAGE PROCESSING METHOD AND IMAGE PROCESSING APPARATUS

(71) Applicant: CANON KABUSHIKI KAISHA, Tokyo (JP)

(72) Inventors: Kouta Murasawa, Yokohama (JP); Akitoshi Yamada, Yokohama (JP); Nobutaka Miyake, Yokohama (JP); Tomokazu Ishikawa, Yokohama (JP); Shinjiro Hori, Yokohama (JP); Fumitaka Goto, Tokyo (JP); Ryosuke Iguchi, Kawasaki (JP); Hidetsugu Kagawa, Kawasaki (JP); Hiromitsu Akiba, Yokohama (JP); Senichi Saito, Funabashi (JP); Junichi Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/167,417

(22) Filed: Jan. 29, 2014

(65) Prior Publication Data
US 2014/0218753 A1   Aug. 7, 2014

(30) Foreign Application Priority Data

Feb. 1, 2013   (JP) ................................. 2013-018507

(51) Int. Cl.
*G06K 15/02*   (2006.01)
*H04N 1/40*   (2006.01)
(Continued)

(52) U.S. Cl.
CPC ........... *H04N 1/40068* (2013.01); *H04N 1/58* (2013.01); *H04N 1/642* (2013.01)

(58) Field of Classification Search
None
See application file for complete search history.

(56) References Cited

U.S. PATENT DOCUMENTS 5,125,072 A * 6/1992 Ng .............................. 358/1.13
6,314,208 B1 * 11/2001 Konstantinides ....... G06T 9/005
                                                            382/239

(Continued)

FOREIGN PATENT DOCUMENTS

JP   H04-151976 A   5/1992
JP   H06-062229 A   3/1994
(Continued)

*Primary Examiner* — Richa Mishra
(74) *Attorney, Agent, or Firm* — Canon U.S.A., Inc. IP Division

(57) ABSTRACT

In low-resolution processing (reduction processing) in which input image data is separated into character print data and image print data to generate print data of lower resolution than that of the input image data, if a plurality of pixels is simply reduction-processed to one pixel, color of a color image surrounding a character may change. In an image processing method, calculation for performing reduction processing so that the plurality of pixels in the input image data corresponds to one pixel in the print data is performed as follows. A ratio of using a pixel value of a character attribute pixel in the calculation is set to 0, or set smaller than a ratio of using a pixel value of an image attribute pixel. As a result, a change in the color of the color image surrounding the character can be prevented.

27 Claims, 23 Drawing Sheets

(51) Int. Cl.
*H04N 1/58* (2006.01)
*H04N 1/64* (2006.01)

(56) References Cited

U.S. PATENT DOCUMENTS

| | | |
|---|---|---|
| 2002/0051030 A1 | 5/2002 | Silverbrook |
| 2005/0146755 A1* | 7/2005 | Shimokawa ....... G03G 15/5091 358/453 |
| 2005/0264849 A1 | 12/2005 | Hagiwara |
| 2009/0002739 A1* | 1/2009 | Lapstun ................ B41J 2/0452 358/1.9 |
| 2009/0034005 A1* | 2/2009 | Gotoh ...................... H04N 1/56 358/3.06 |
| 2009/0080786 A1 | 3/2009 | Tsutsumi |
| 2010/0080474 A1* | 4/2010 | Genda ............... H04N 1/40062 382/233 |
| 2012/0236337 A1* | 9/2012 | Shimosato ......... H04N 1/40068 358/1.9 |
| 2013/0028520 A1* | 1/2013 | Kondo ................. G06T 7/0048 382/195 |

FOREIGN PATENT DOCUMENTS

| | | |
|---|---|---|
| JP | 2003-508827 A | 3/2003 |
| JP | 2005-335372 A | 12/2005 |
| JP | 2009-077177 A | 4/2009 |
| JP | 2012-165192 A | 8/2012 |

\* cited by examiner

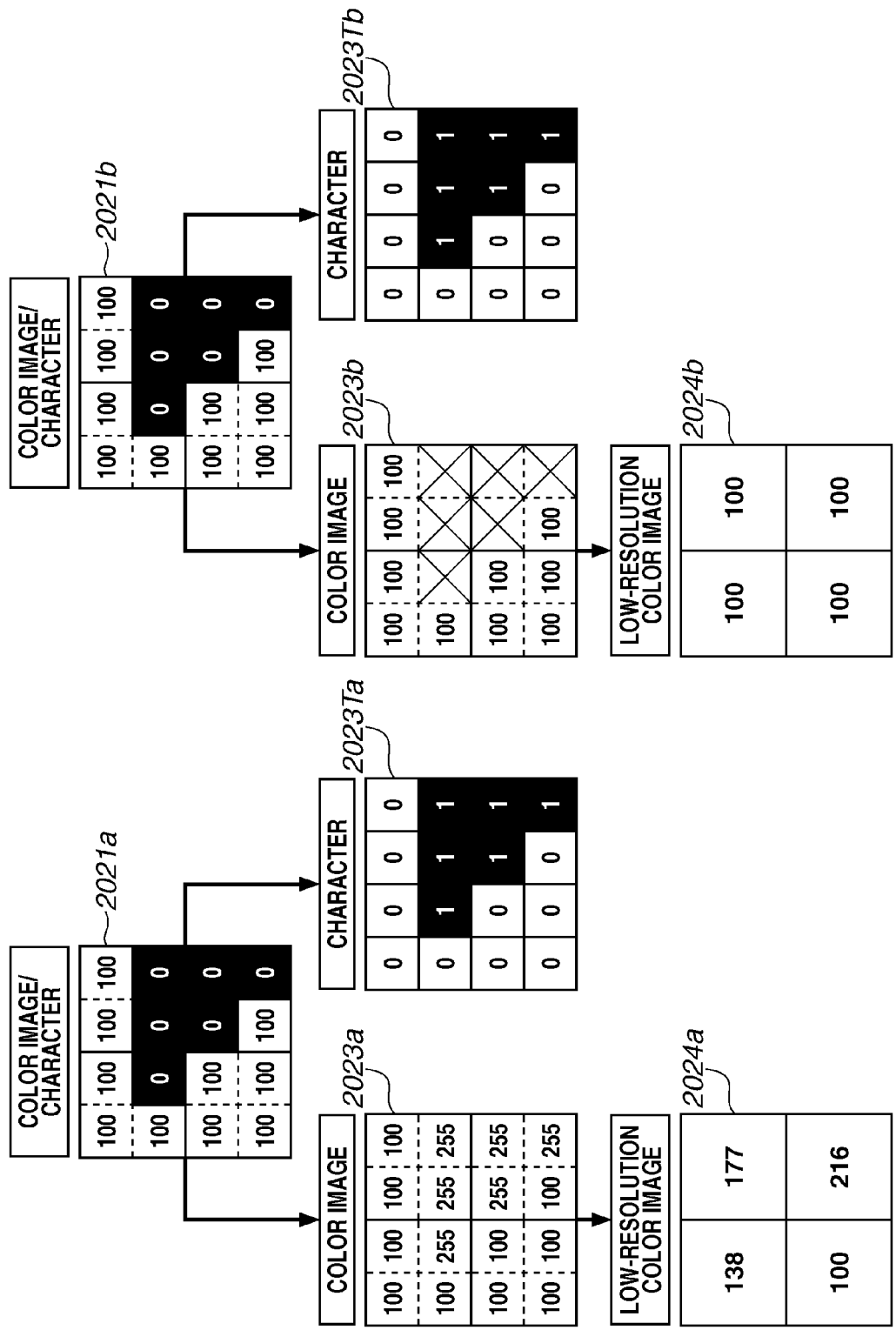

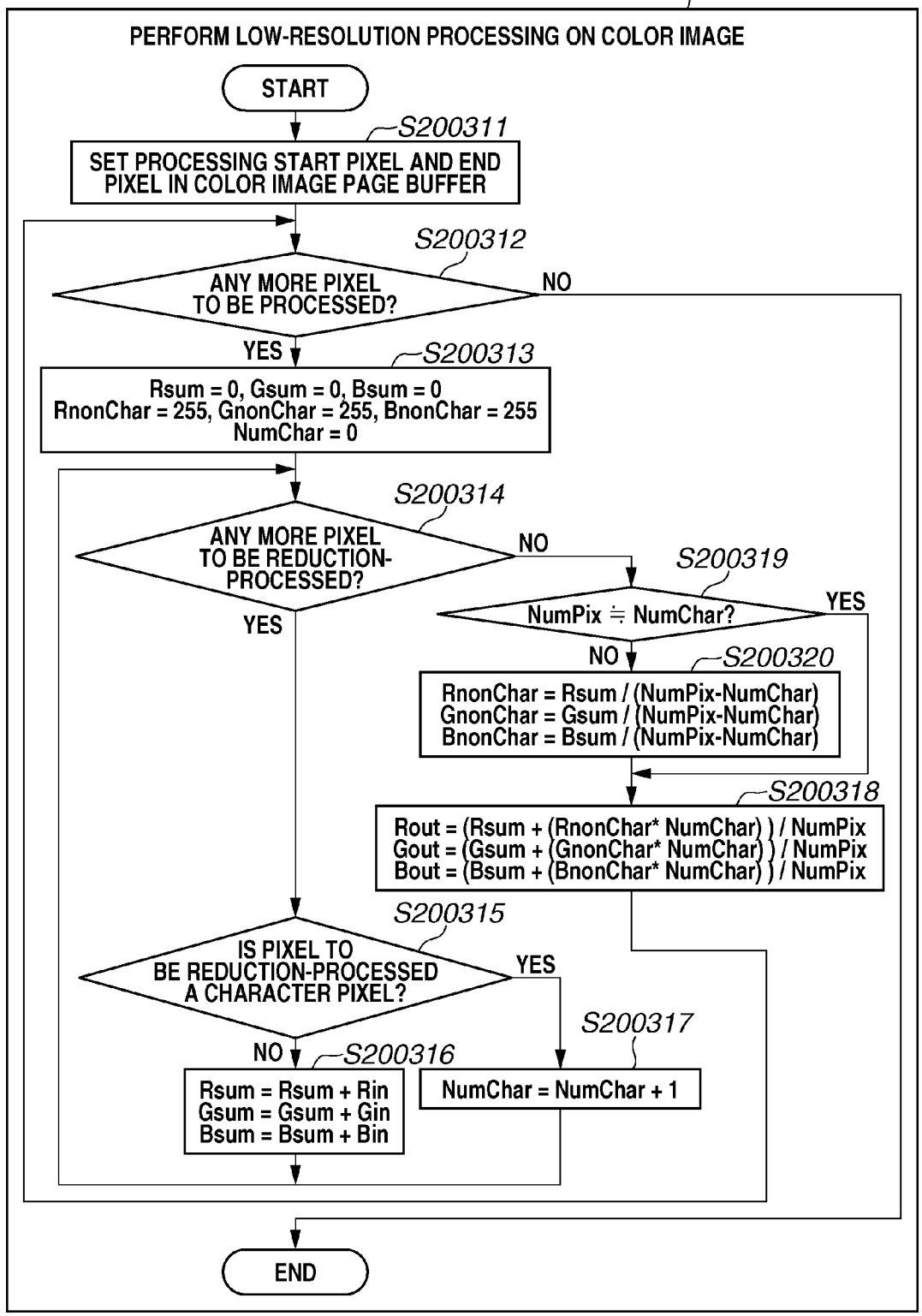

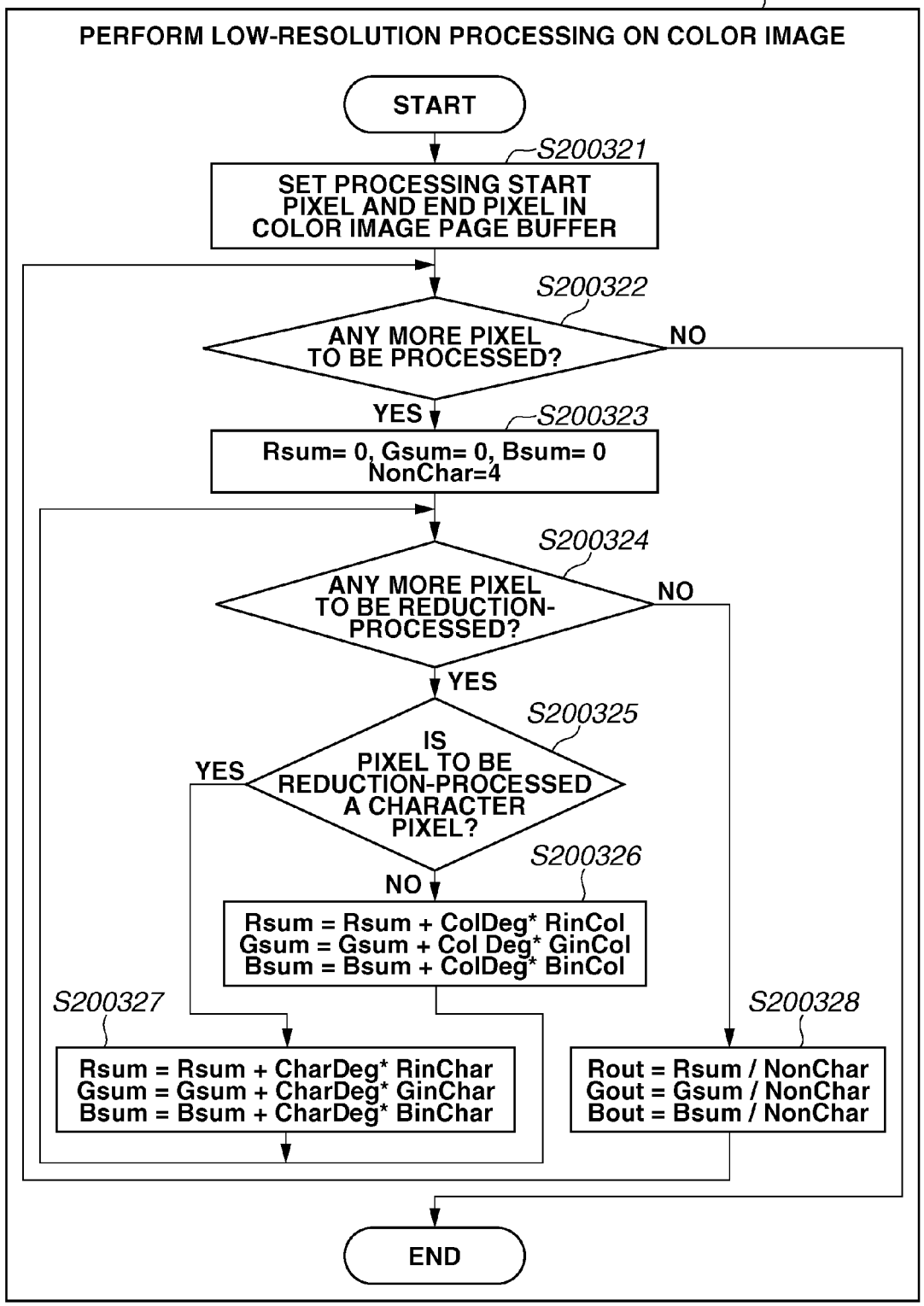

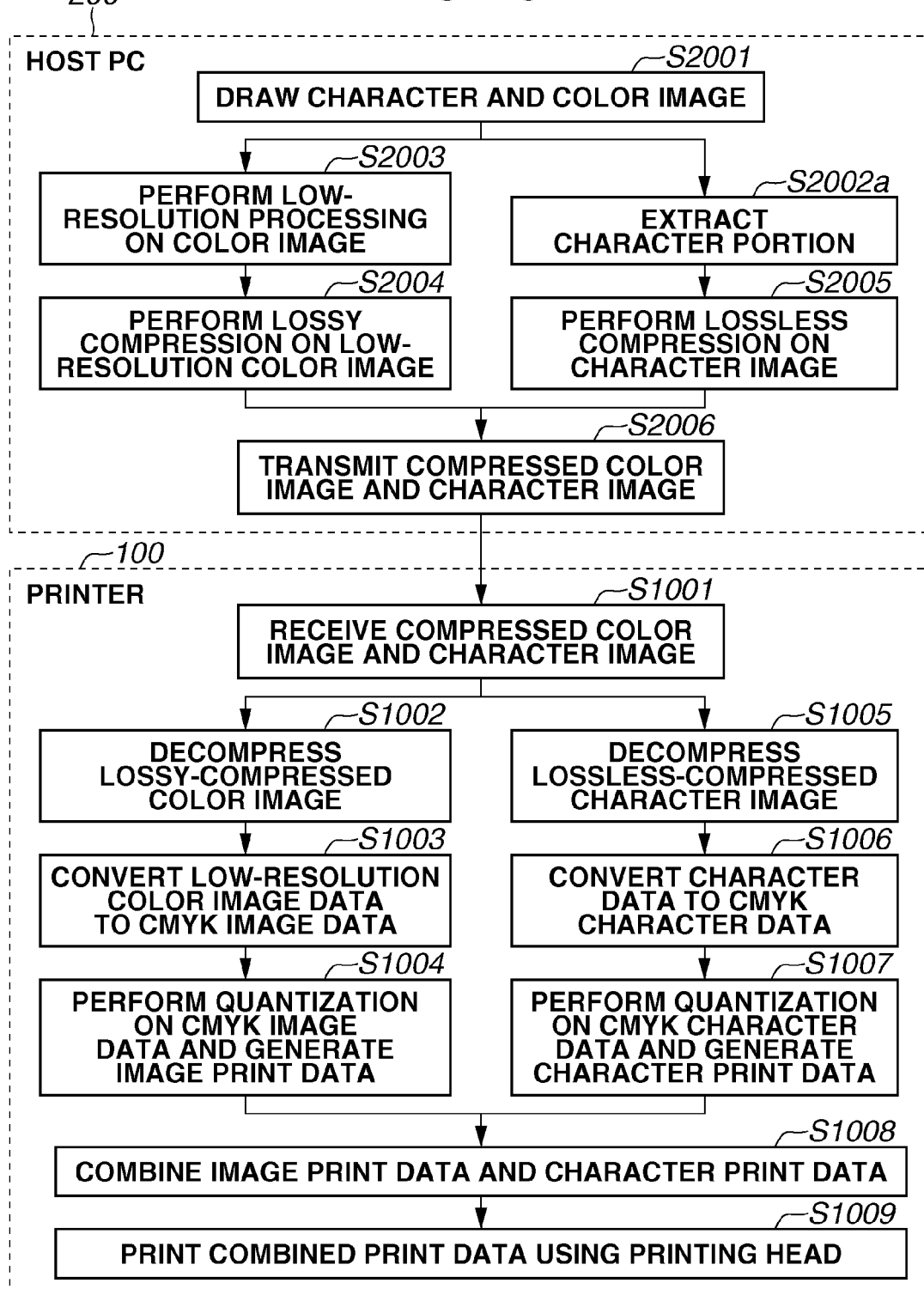

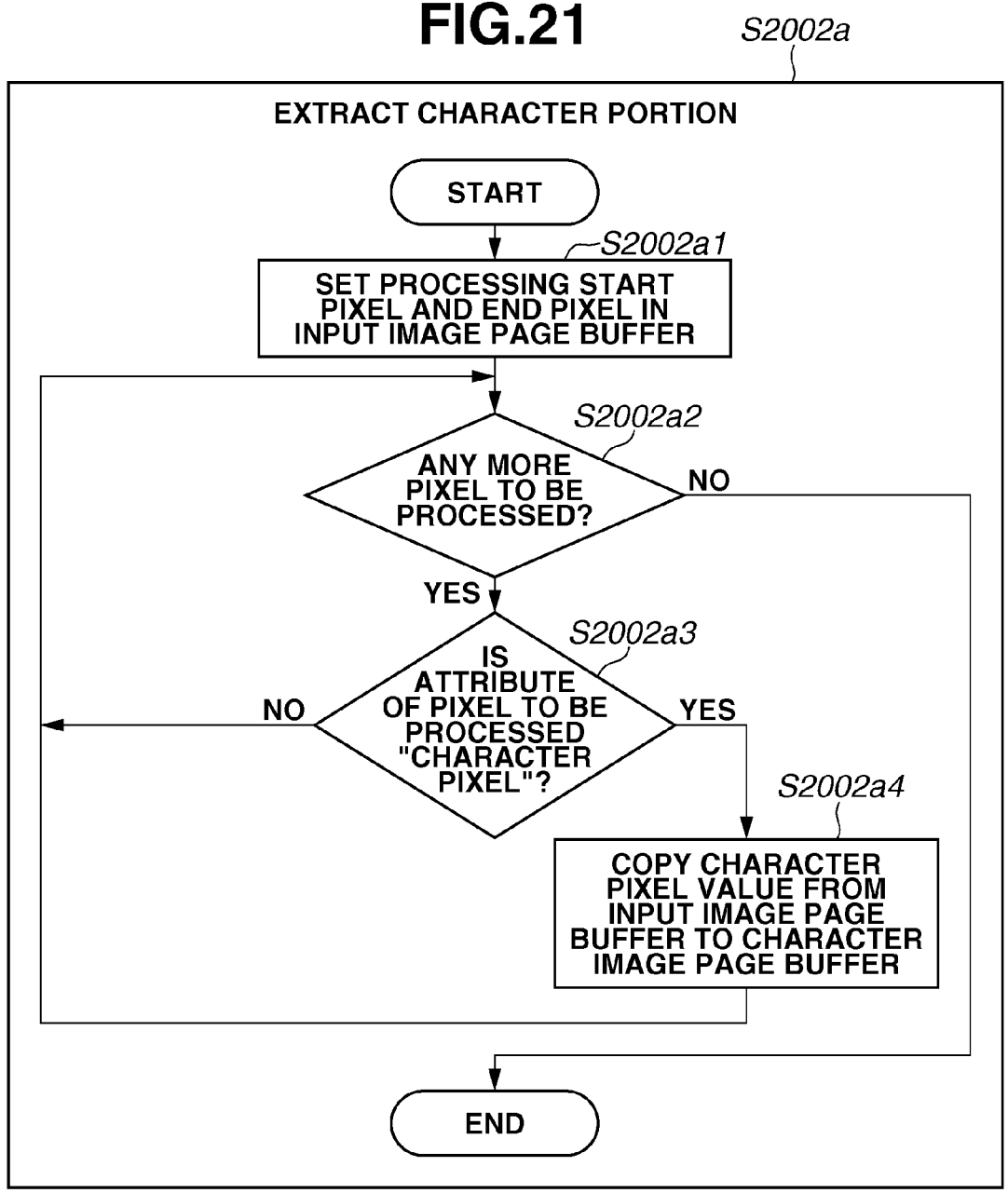

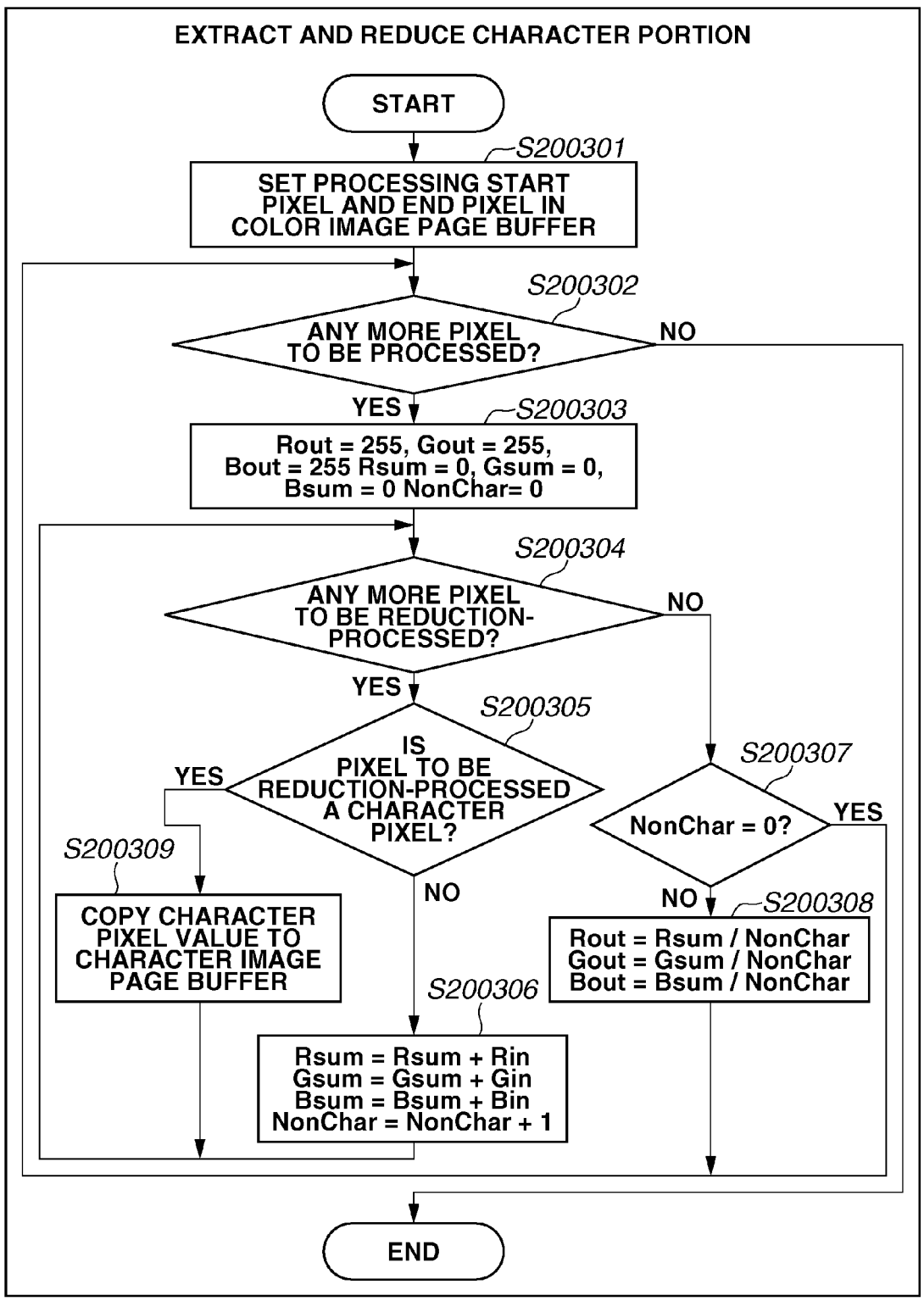

IMAGE PROCESSING METHOD AND IMAGE PROCESSING APPARATUS

BACKGROUND OF THE INVENTION

Field of the Invention

The present generally relates to image processing and, more particularly, to an image processing method and an image processing apparatus for generating print data based on input image data.

Description of the Related Art

When printed images are used as business documents, the quality level of characters is regarded as most important, so that it is necessary to print character images in high resolution. If such a high-resolution color image is to be processed, the amount of image data transferred to a printer increases. Further, a large processing load may be generated in the printer for storing and processing such image data.

To address this issue, there is a method in which a printer driver transfers multi-valued image data to the printer, and the printer then converts the multi-valued image data to low gradation image data. The printer thus forms an image on a printing medium based on the low gradation printing data. Such a method is advantageous in that the process to be performed by the printer driver can be performed by a plurality of printers in a common way.

Further, Japanese Patent Application Laid-Open No. 2003-508827 discusses a technique for separating input image data into data corresponding to a color image portion and data corresponding to black character image portion. Each data is then separately compressed and transferred, and the printer combines the processed data.

However, if the input image data is separated, and low-resolution processing is simply performed on each separated data, color may change at a boundary portion between the color image portion (i.e., an image portion) and the character portion. Image quality may thus be degraded. More specifically, a value of one pixel in a low-resolution color image portion is determined based on the values of a plurality of pixels included in a unit region of the input image data. In such a case, if the color image portion and the character portion are both included in the unit region, the determined value becomes different from the value of the original color image portion. If the printer then performs printing based on such data, the color changes at the boundary portion between the color image portion and the character portion, so that the image quality is degraded.

SUMMARY OF THE INVENTION

According to an aspect of the present disclosure, an image processing method generates, based on input image data for printing on a predetermined region of a printing medium an image including an object of a character attribute and an object of an image attribute, print data which is of lower resolution than that of the input image data according to the predetermined region. The image processing method includes obtaining attribute information on each of a plurality of pixels in the input image data which corresponds to a target pixel in the print data, and determining a value of the target pixel in the print data by using a value of a pixel on which the attribute information indicates the image attribute, among the plurality of pixels in the input image data, at a higher ratio than a value of a pixel on which the attribute information indicates the character attribute.

Further features of the present disclosure will become apparent from the following description of exemplary embodiments with reference to the attached drawings.

BRIEF DESCRIPTION OF THE DRAWINGS

FIGS. 14A and 14B illustrate results of low-resolution processing according to the first exemplary embodiment of the present disclosure and a comparison example.

FIG. 16 is a flowchart illustrating reduction processing performed according to a third exemplary embodiment of the present disclosure.

FIG. 17 is a flowchart illustrating reduction processing performed according to the third exemplary embodiment.

FIG. 20 is a flowchart illustrating image processing performed according to a fourth exemplary embodiment of the present disclosure.

FIG. 21 is a flowchart illustrating a process for generating the character image according to the fourth exemplary embodiment.

FIG. 22 is a flowchart illustrating a process for performing at the same time extraction of the character portion and low-resolution processing according to the fourth exemplary embodiment.

DESCRIPTION OF THE EMBODIMENTS

Figure 1:
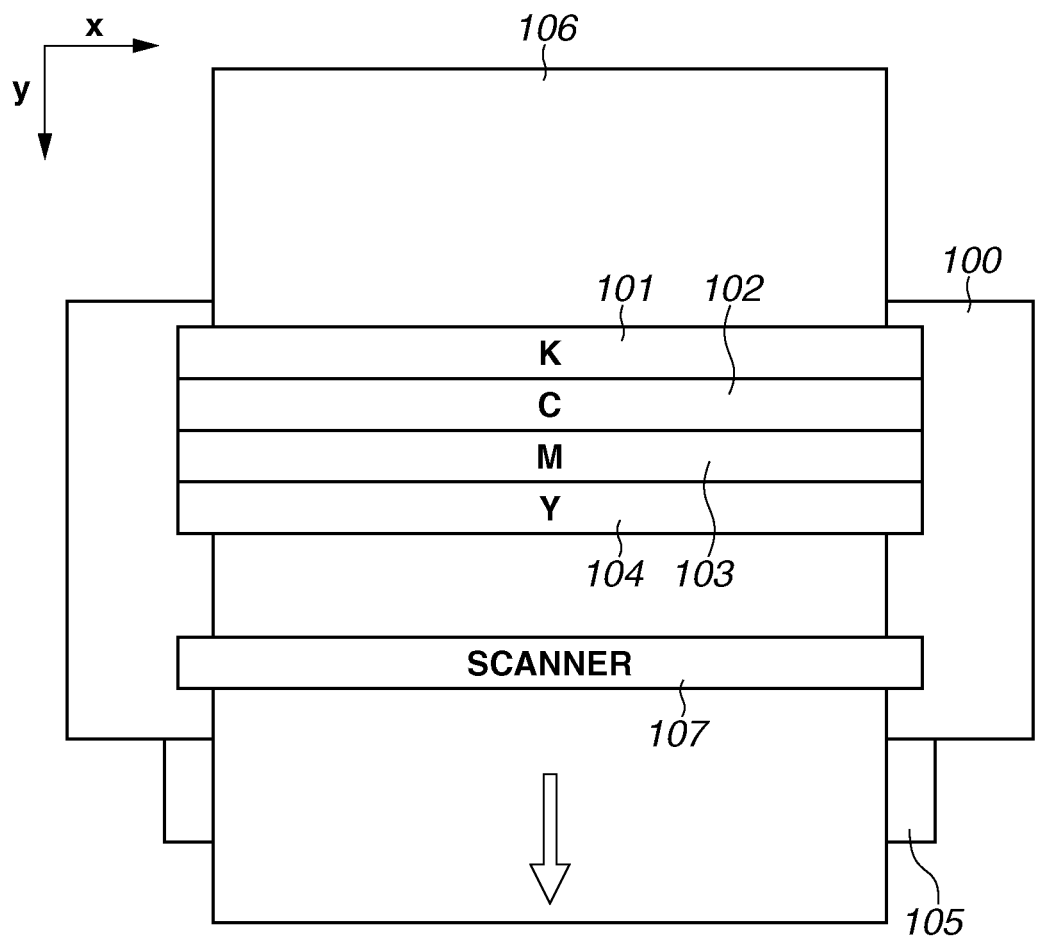
FIG. 1 is a schematic diagram illustrating an inkjet printer.

FIG. 1 is a schematic diagram illustrating an inkjet printer serving as a printing apparatus according to a first exemplary embodiment of the present disclosure. According to the present exemplary embodiment, the printer is a full-line type printing apparatus, and includes printing heads 101, 102, 103, and 104. The printing heads 101, 102, 103, and 104 respectively discharge black (K), cyan (C), magenta (M), and yellow (Y) inks. A plurality of nozzles which discharges the ink along an x direction illustrated in FIG. 1 are arranged at distances of 1200 dots per inch (dpi). The printing heads 101, 102, 103, and 104 which are thus arranged along a y direction illustrated in FIG. 1 apply the inks of a plurality of colors to a printing medium 106, thereby forming the color image.

Figure 2:
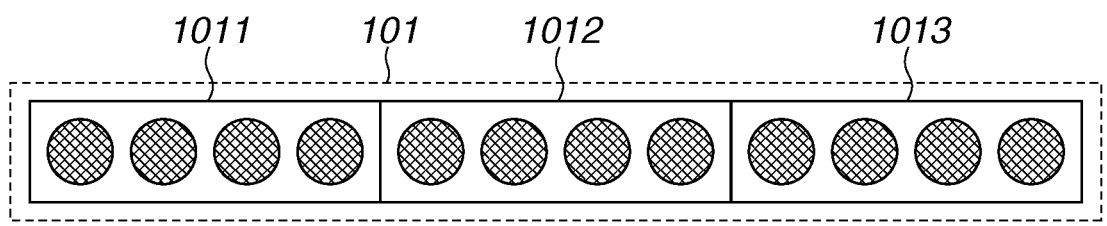
FIG. 2 illustrates a configuration of a printing head.

FIG. 2 illustrates an arrangement of the nozzles in the printing head 101. Referring to FIG. 2, a plurality of discharge substrates 1011, 1012, and 1013 is arranged along the x direction in which the nozzles are aligned in the printing head 101. Four nozzle arrays, each of which the nozzles are aligned therein in the x direction, are arranged in the y direction in each discharge substrate.

Referring to FIG. 1, a motor (not illustrated) rotates a conveyance roller 105 (and other rollers which are not illustrated), so that the printing medium 106 is conveyed in the y direction. The printing heads 101, 102, 103, and 104 discharge from the respective nozzles provided therein, ink droplets (i.e., dots) while the printing medium 106 is being conveyed. A conveyance speed of the conveyance roller 105 and a discharge frequency of the ink droplets from the printing heads are controlled. The image for one sheet of the printing medium 106 is thus formed at the resolution corresponding to the image data.

A scanner 107 in which reading elements are arranged at a predetermined pitch is disposed in the y direction illustrated in FIG. 1, at a position downstream from the printing heads 101, 102, 103, and 104 and in parallel therewith. The scanner 107 reads the image printed using the printing heads 101, 102, 103, and 104 and outputs the read result as red (R), green (G), and blue (B) multi-valued data.

Figure 3:
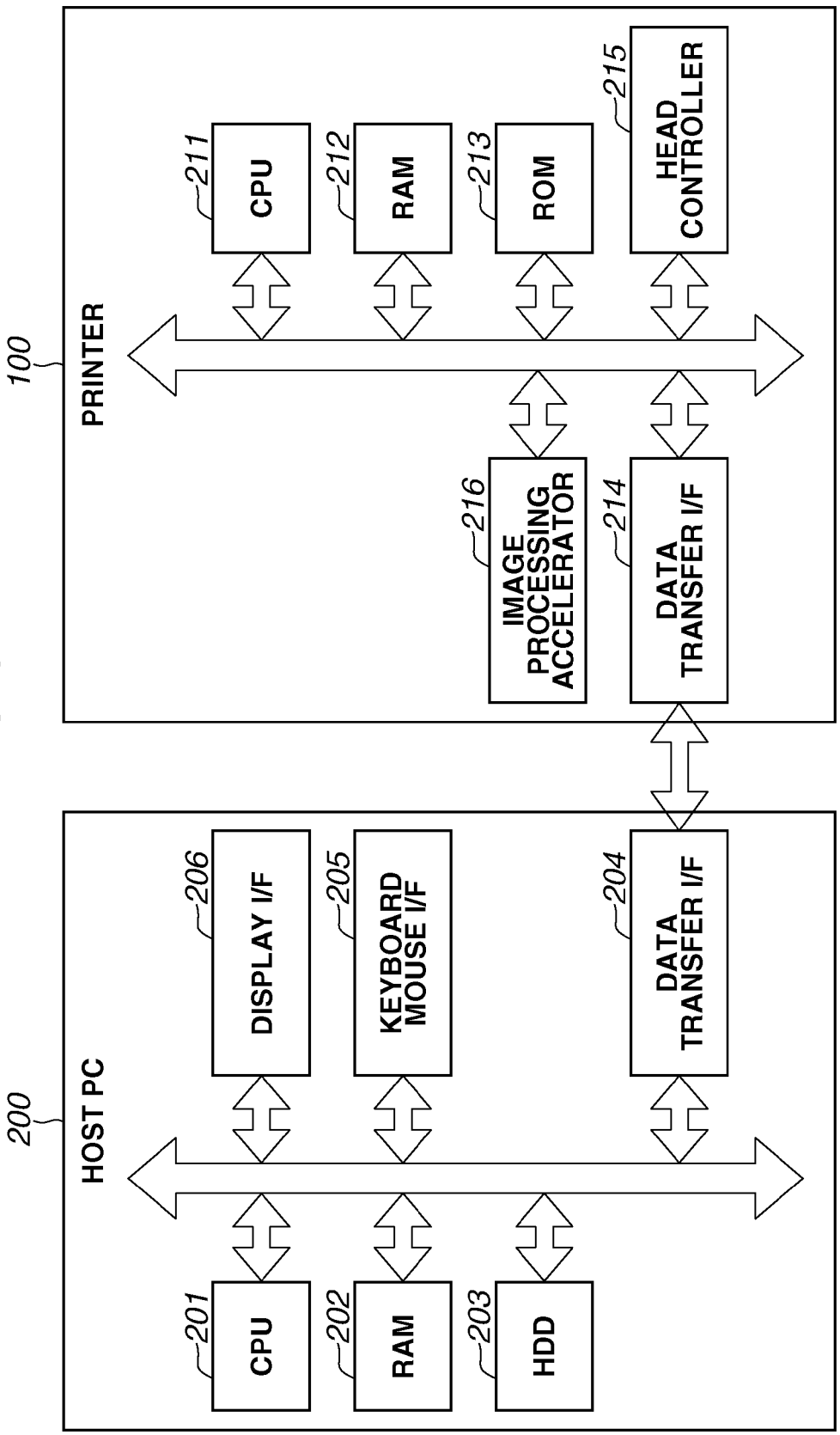
FIG. 3 is a block diagram illustrating a printing system.

FIG. 3 is a block diagram illustrating the printing system according to the present exemplary embodiment. Referring to FIG. 3, the printing system includes a printer 100 illustrated in FIG. 1 and a host personal computer (PC) 200 as a host apparatus thereof.

The host PC 200 mainly includes the following elements. A central processing unit (CPU) 201 executes the processes according to programs stored in a hard disk drive (HDD) 203 and a random access memory (RAM) 202 serving as storing units. The RAM 202 is a volatile storage which temporarily stores programs and data. The HDD 203 is a non-volatile storage which similarly stores programs and data. A quantization mask used in a quantization to be described below is also stored in the HDD 203. A data transfer interface (I/F) 204 controls transmission and reception of data between the host PC 200 and the printer 100. A universal serial bus (USB), The Institute of Electrical and Electronics Engineers (IEEE) 1394, and a local area network (LAN) may be used as connection methods for transmitting and receiving the data. A keyboard mouse I/F 205 controls human interface devices (HID) such as a keyboard and a mouse. A user can perform input via the keyboard/mouse I/F 205. A display I/F 206 controls displaying on a display device (not illustrated).

On the other hand, the printer 100 mainly includes the following elements. A CPU 211 executes the processes to be described below according to the programs stored in a read-only memory (ROM) 213 and a RAM 212. The RAM 212 is a volatile storage which temporarily stores programs and data. The ROM 213 is a non-volatile storage which stores table data and programs to be used in the processes described below. A data transfer interface I/F 214 controls transmission and reception of data between the printer 100 and the host PC 200. A head controller 215 supplies printing data to the printing heads 101, 102, 103, and 104 illustrated in FIG. 1, and controls the discharge operations performed by them. More specifically, the head controller 215 reads control parameters and the printing data from a predetermined address of the RAM 212. The CPU 211 then writes the control parameters and the printing data in the predetermined address of the RAM 212. The head controller 215 thus activates the process, and the printing heads 101, 102, 103, and 104 discharge the ink droplets. An image processing accelerator 216 is hardware capable of executing image processing at a higher speed as compared to the CPU 211. More specifically, the image processing accelerator 216 reads from a predetermined address of the RAM 212 the parameters and the data for performing image processing. The CPU 211 then writes in the predetermined address of the RAM 212 the parameters and the data, so that the image processing accelerator 216 is activated and performs predetermined image processing on the data. According to the present exemplary embodiment, the CPU 211 performs quantization processing to be described below using software. On the other hand, the image processing accelerator 216 performs using the hardware the image processing for printing the image including the quantization processing. The image processing accelerator 216 is not always necessary, and the CPU 211 may singularly perform processing for generating the table parameters and image processing depending on a specification of the printer.

Figure 4:
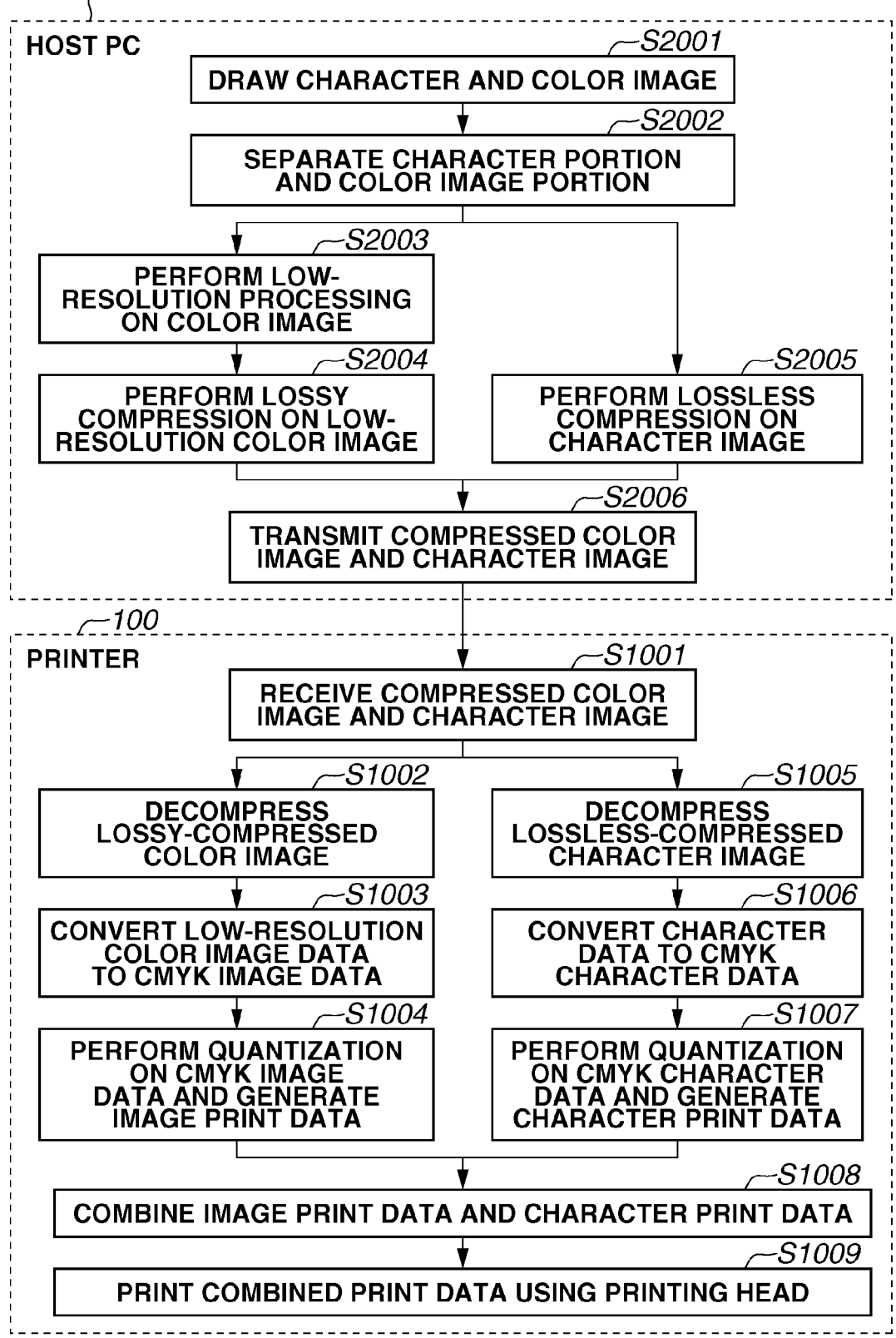
FIG. 4 is a flowchart illustrating image processing performed according to a first exemplary embodiment of the present disclosure.

FIG. 4 is a flowchart illustrating image processing performed by an inkjet print system according to the present exemplary embodiment. According to the present exemplary embodiment, a host PC and the inkjet printer are the PC 200 and the printer 100 illustrated in FIG. 3, respectively.

The host PC 200 performs the processes of step S2001 to step S2006 to be described below. In step S2001, the host PC 200 draws (decompresses) on a page buffer set in the RAM 202 an input image including a character image and a color image, based on page description language (PDL). In step S2002, the host PC 200 separates the character portion and the color image portion (i.e., the image portion) in the drawn input image to generate character data and color image data. In step S2003, the host PC 200 performs low-resolution processing on the color image data. In step S2004, the host PC 200 performs lossy compression on the low-resolution color image data. In step S2005, the host PC 200 performs lossless compression on the generated character data. In step S2006, the host PC 200 transmits to the printer 100 the compressed color image data and character data. There is no limit on the order of processes branched into steps S2003 and S2004, and step S2005 to be performed.

The printer 100 then performs the processes of step S1001 to step S1009 to be described below. In step S1001, the printer 100 receives from the host PC 200 the compressed color image data and character data. In step S1002, the printer 100 decompresses the color image which has been lossy-compressed to generate the low-resolution color image data. In step S1003, the printer 100 converts the low-resolution color image data to multi-valued CMYK image data corresponding to each of the C, M, Y, and K ink colors. In step S1004, the printer 100 quantizes the multi-valued CMYK image data to generate image print data (i.e., first dot data) which indicates whether the ink droplets are to be discharged. In step S1005, the printer 100 decompresses the data of the character image which has been lossless-compressed to generate the character data. In step S1006, the printer 100 converts the character data to the multi-valued CMYK character data corresponding to each of the C, M, Y, and K ink colors. In step S1007, the printer 100 quantizes the multi-valued CMYK character data to generate character print data (i.e., second dot data). In step S1008, the printer 100 combines the image print data and the character print data to generate combined print data (i.e., third dot data). In step S1009, the printer 100 controls the printing heads based on the combined print data and thus prints the image on the printing medium. In the above-described process, the printer 100 performs both of the processes which are branched from step S1001, i.e., the processes of steps S1002 to S1004 and the processes of steps S1005 to S1007, instead of only one of the branched processes. The printer 100 then combines the results of both processes in step S1008. For this reason, there is no limit on the order of the respective processes to be performed.

Figure 5:
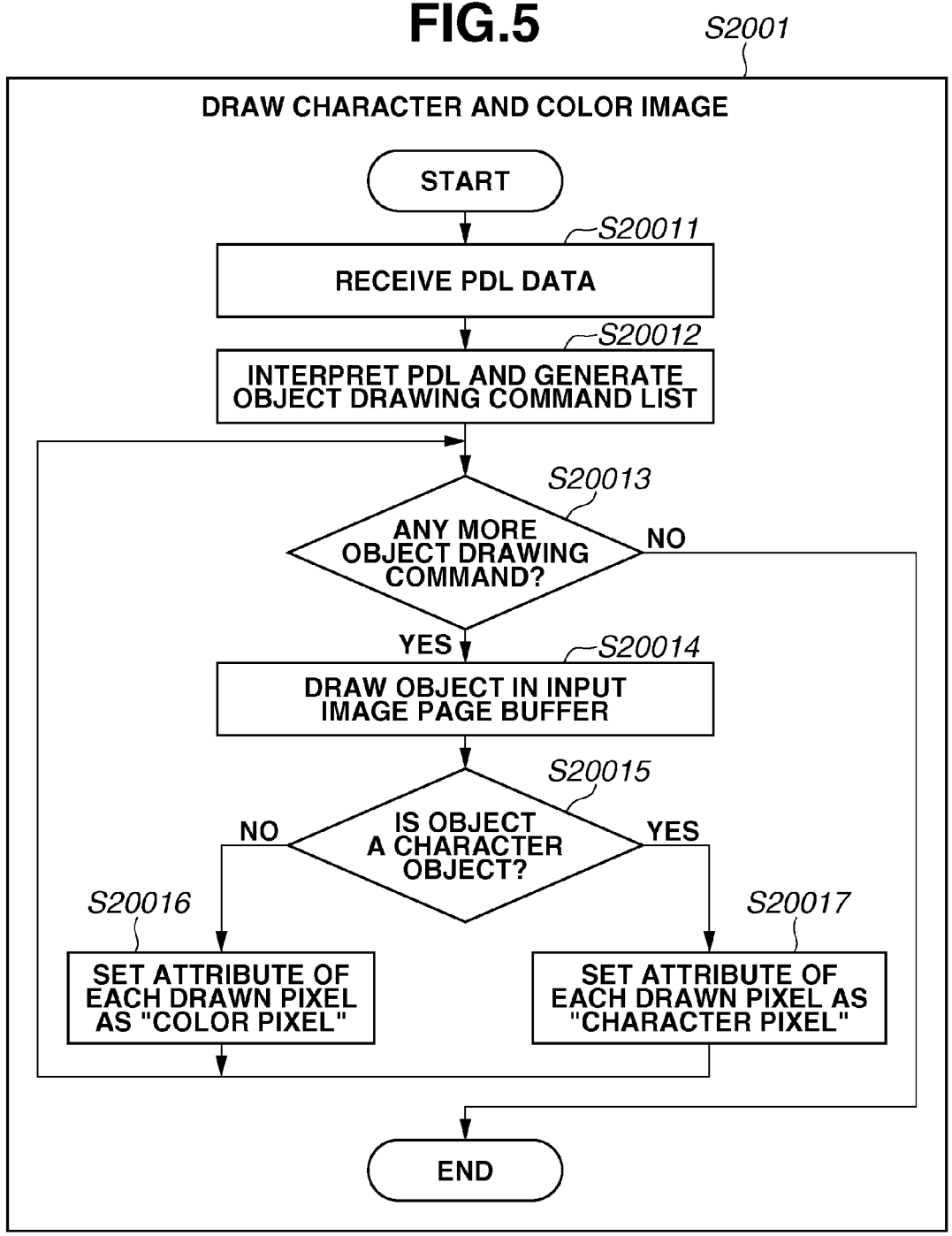
FIG. 5 is a flowchart illustrating a process for drawing an input image including a character image and a color image.

The processes performed in each of the steps will be described in detail below. FIG. 5 is a flowchart illustrating an example of the process for drawing the input image including the character image and the color image, based on the PDL, performed in step S2001 in the flowchart illustrated in FIG. 4. Any of the following types of PDL may be used though they are generally referred to as PDL here.

PostScript, Portable Document Format (PDF)(Adobe Systems Inc.)

Extensible Markup Language (XML) Paper Specification (XPS) (Microsoft Corporation)

In step S20011, the host PC 200 receives the data written in PDL. In step S20012, the host PC 200 interprets the PDL to generate a list in which object drawing commands are aligned in a drawing order. In step S20013, the host PC 200 determines whether all object drawing commands in the list have been processed. If there is no more drawing object command in the list (NO in step S20013), the process ends. If there is any more object drawing command remaining in the list (YES in step S20013), the process proceeds to step S20014. In step S20014, the host PC 200 draws in the input image page buffer in the RAM 202 the object to be drawn in the present process. In such a case, the host PC 200 draws at a drawing resolution which is the final resolution desired as the character quality level. Further, according to the present exemplary embodiment, the image data to be drawn is eight bits for each of R, G, and B. However, exemplary embodiments of the present disclosure are not limited to eight bits, and higher gradation expression may be performed employing a larger number of bits, such as 16 bits.

In step S20015, the host PC 200 determines whether the object to be drawn in the present process is a character object. More specifically, the host PC 200 determines whether the object is a character object by determining whether the object to be drawn is a bitmap image. If the object is not a bitmap image, the host PC 200 determines that the object is a character object. If the object is not a character object (NO in step S20015), the process proceeds to step S20016. If the object is a character object (YES in step S20015), the process proceeds to step S20017.

In general, it is written in PDL that the color image such as a photograph is to be drawn as the bitmap image, and the character object drawn as a vector drawing command or a character code and font information. As a result, the attribute information of each pixel can be obtained based on the data written in PDL according to the above-described method. In step S20016, the host PC 200 sets "color pixel (image)" as the attribute of each pixel which has been drawn in the present process. The process then returns to step S20013 to process the subsequent object to be drawn. In step S20017, the host PC 200 sets "character pixel" as the attribute of each pixel which has been drawn in the present process. The process then returns to step S20013 to process the subsequent object to be drawn.

Figure 7:
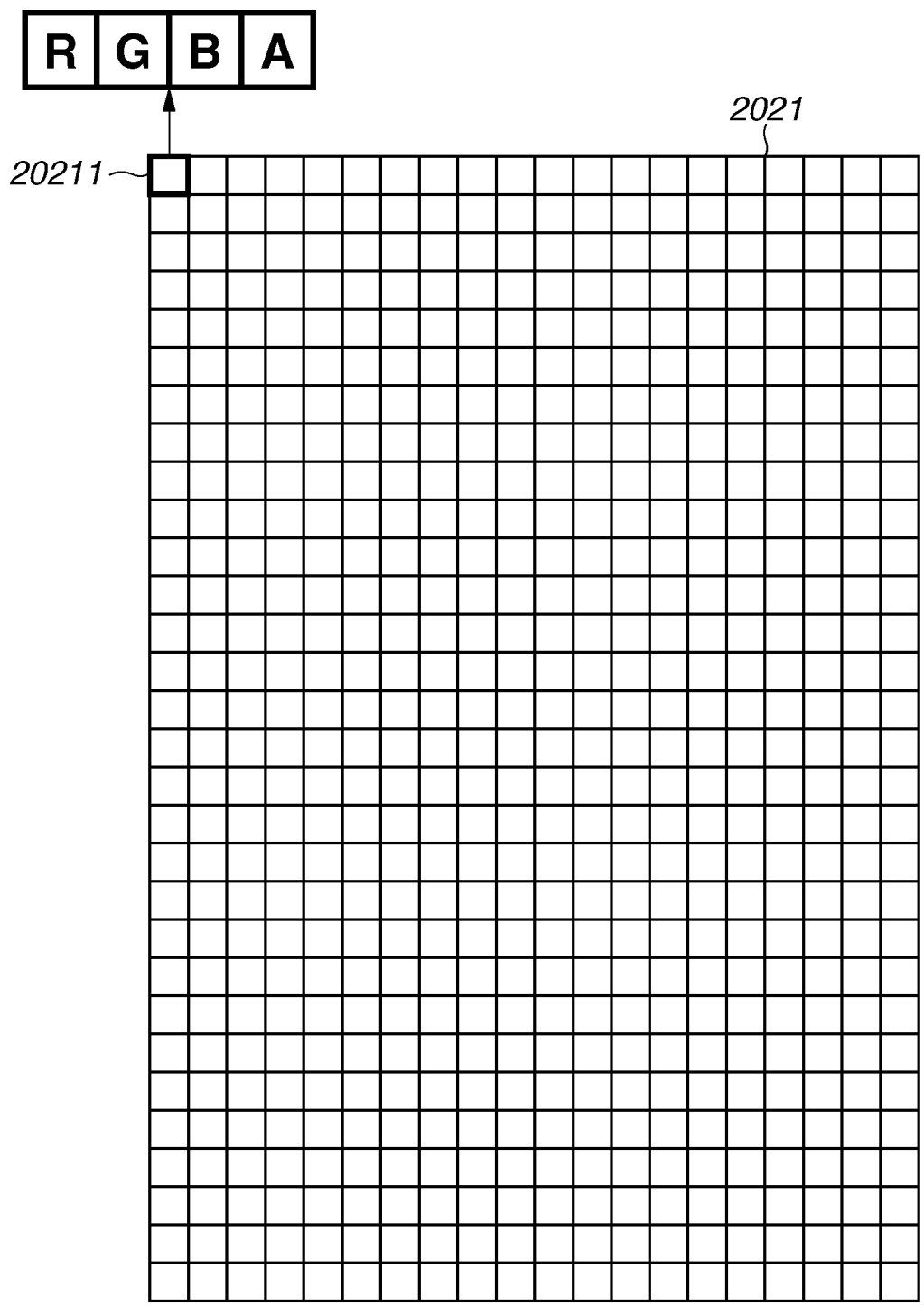
FIG. 7 illustrates an example of an input image page buffer.

FIG. 7 illustrates an example of the input image page buffer set in the RAM 202 in the host PC 200. Referring to FIG. 7, an input image page buffer 2021 has a region of a predetermined number of pixels in a horizontal direction and in a vertical direction, and includes a top pixel 20211. Each pixel includes an RGB value and an attribute value A. The RGB value is data indicating color coordinates (R, G, B) in a color space coordinate system such as standard (s) RGB, i.e., expression colors of a monitor. In such a case, the host PC 200 sets in step S20014 in the flowchart illustrated in FIG. 5, the information on the color to an RGB region in each pixel. Further, in step S20016 or step S20017, the host PC 200 sets an attribute value A region.

Figure 8:
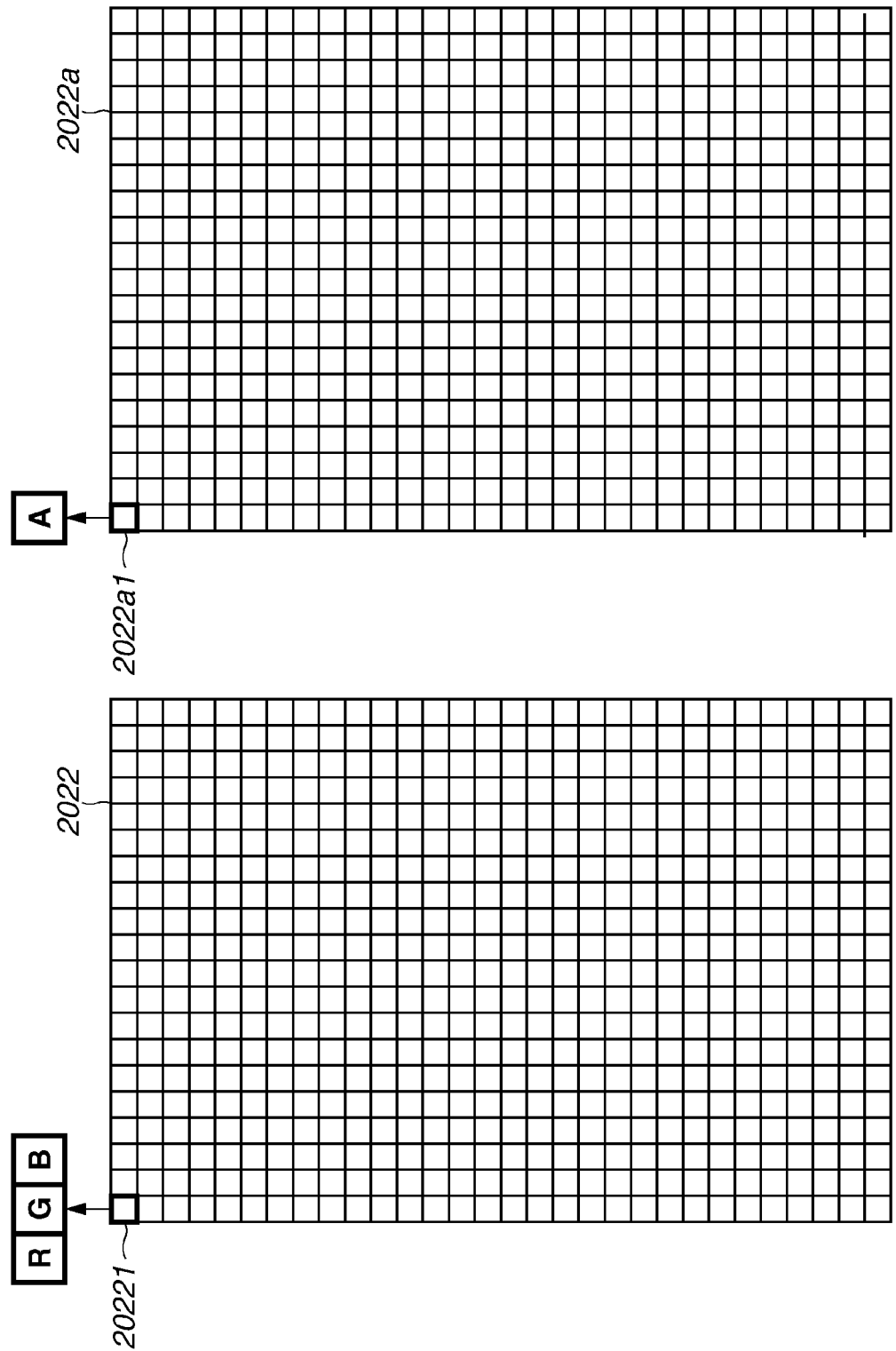
FIG. 8 illustrates another example of the input image page buffer.

FIG. 8 illustrates another example of the input image page buffer. Referring to FIG. 8, an input image page buffer 2022 and an attribute value buffer 2022a respectively have regions of a predetermined number of pixels in the horizontal direction and in the vertical direction, and respectively include top pixels 20221 and 2022a1. Each pixel in the input image page buffer 2022 includes the RGB value, and each pixel in the attribute value buffer 2022a includes the attribute value A. In such a case, in step S20014 in the flowchart illustrated in FIG. 5, the host PC 200 sets the information on the color to the RGB region in each pixel in the input image page buffer 2022. In step S20016 or in step S20017, the host PC 200 sets the attribute value A region in the attribute value buffer 2022a. Further, there may be various examples, such as having separate buffers for each of R, G, B, and A, and any of the methods may be used. If the buffer configuration illustrated in FIG. 7 is employed, only one type of address is to be managed, so that control can be simplified, and the program size becomes small. Further, if the buffer configuration illustrated in FIG. 8 is employed, the attribute value buffer size can be decreased and an amount of memory to be used can be reduced when the number of bits for expressing the attribute value is smaller than the number of bits of the RGB value.

Figure 6:
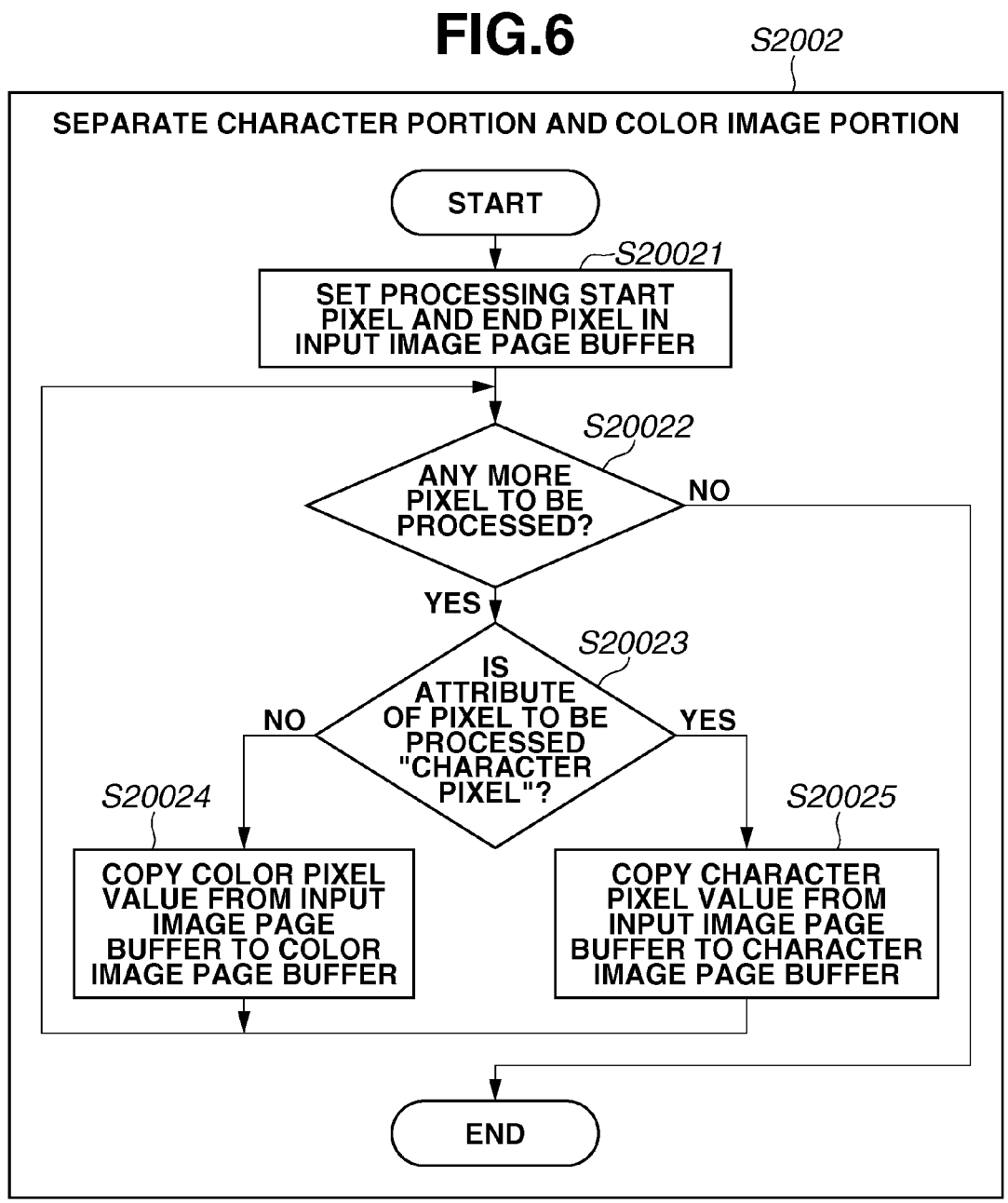
FIG. 6 is a flowchart illustrating a process for separating a character portion and a color image portion to generate the character image and the color image.

FIG. 6 is a flowchart illustrating in detail the process performed in step S2002 of the flowchart illustrated in FIG. 4. More specifically, the host PC 200 separates the character image and the color image in the input image data to generate the character data and the color image data (i.e., the image attribute data). In step S20021, the host PC 200 sets a processing start pixel and a processing end pixel in the input image page buffer. In step S20022, the host PC 200 determines whether the end pixel has been reached and that there are no other pixels to be processed. If there is no more pixel to be processed (NO in step S20022), the process ends. If there is any more pixel to be processed (YES in step S20022), the process proceeds to step S20023. In step S20023, the host PC 200 determines whether the attribute value of the pixel to be processed is "character pixel". If the attribute is not "character pixel", i.e., the attribute is "color pixel" (NO in step S20023), the process proceeds to step S20024. If the attribute is "character pixel" (YES in step S20023), the process proceeds to step S20025. In step S20024, the host PC 200 copies to the color image page buffer the color pixel value from the input image page buffer. The process then returns to step S20022 for processing the subsequent pixel. In step S20025, the host PC 200 copies to the character image page buffer the character pixel value from the input image page buffer. The process then returns to step S20022 for processing the subsequent pixel.

Figure 10:
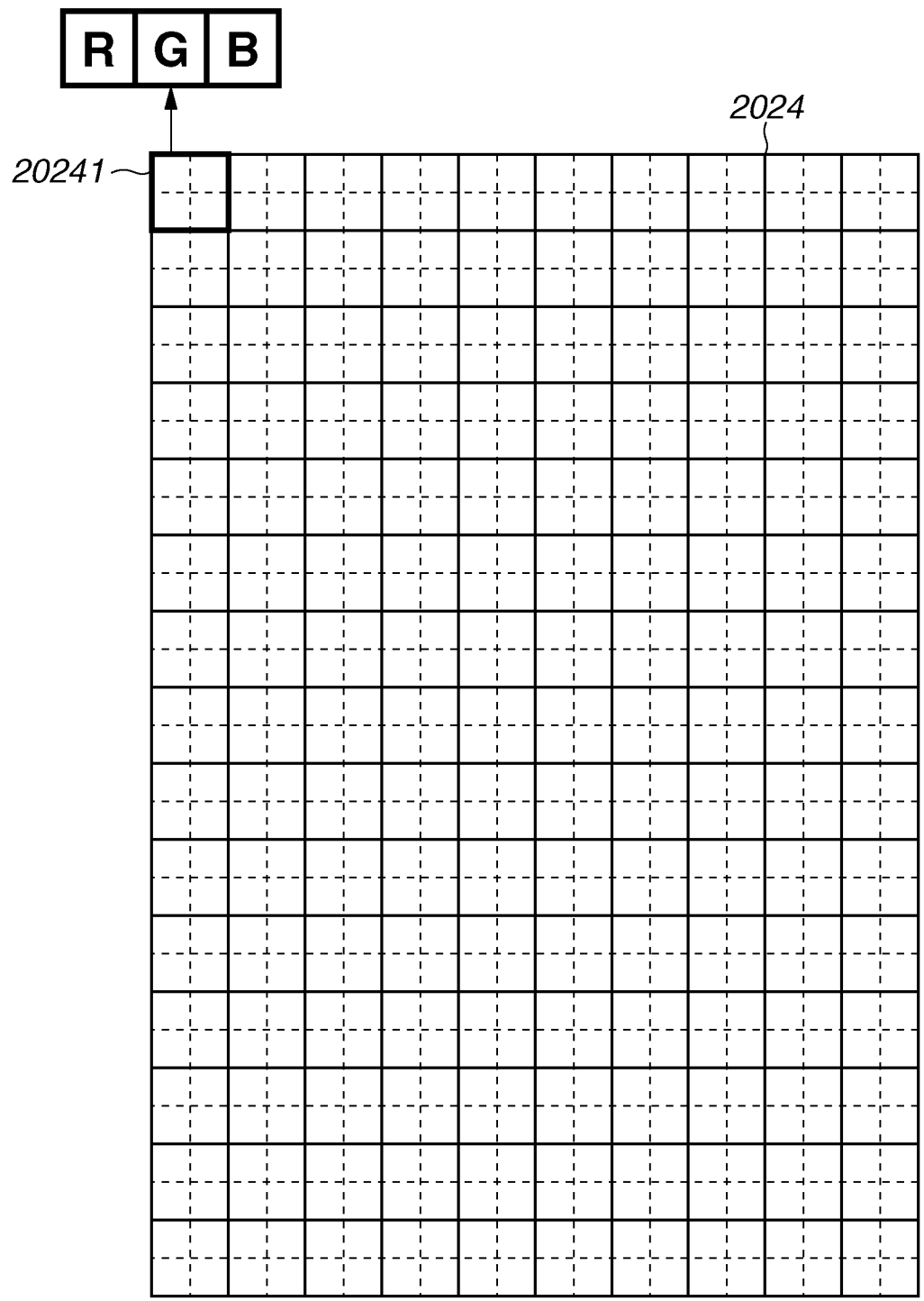
FIG. 10 illustrates a low-resolution color image page buffer.

FIG. 10 illustrates an example of a low-resolution color image page buffer for performing low-resolution processing on the color image data in step S2003 of the flowchart illustrated in FIG. 4. Referring to FIG. 10, a low-resolution color image page buffer 2024 is set in the RAM 202 in the host PC 200. According to the present exemplary embodiment, ½-by-½ reduction processing is performed. As a result, the region of two pixels in the horizontal direction by two pixels in the vertical direction in the color image page buffer before performing low-resolution processing corresponds to one pixel after performing low-resolution processing. The low-resolution color image page buffer 2024 includes a top pixel 20241, and each pixel includes the RGB value. A solid line indicates the boundary of a reduction-processed color pixel after performing low-resolution processing, and a broken line indicates the boundary of the color pixels in the color image page buffer before performing low-resolution processing.

An example of reduction processing will be described below. An average value of the pixel values of the four pixels surrounded by the solid line illustrated in FIG. 10, i.e., the top pixel of the color image page buffer before reduction processing and the pixels to the right, below, and to the lower right of the top pixel, is calculated. The average value is then set as the pixel value of the top pixel 20241 in the low-resolution color image page buffer 2024 after performing reduction processing. By setting the average value of the four pixels in the color image page buffer as one pixel in the low-resolution color image page buffer, reduction processing can be performed on all pixels in the color image page buffer.

According to the present exemplary embodiment, the inventors have discovered that if reduction processing is simply performed on the low-resolution color image data as described above, the character quality level is lowered when the processed color image data is later combined with the print data generated from the character data. Such a problem will be described in detail below with reference to FIGS. 14A and 14B.

FIG. 14A illustrates a comparison example in the case where the character quality level is lowered using the above-described reduction method. Referring to FIG. 14A, only the value of an R channel among the RGBA data is written in an input image page buffer 2021*a*. Further, the attribute information of the image indicated in an A channel is indicated as follows. The color pixel attribute pixel is indicated by a black character on a white background, and the character attribute pixel is indicated by a white character on a black background. The R value of the color pixel attribute pixel is 100, and the R value of the character attribute pixel is 0 in the case of the black character in the input image page buffer 2021*a* previous to performing reduction processing. In step S2002 in the flowchart illustrated in FIG. 4, the host PC 200 generates a color image page buffer 2023*a* and a character image page buffer 2023Ta, based on the input image page buffer 2021*a*. According to the comparison example, the character portion in the color image page buffer 2023*a* is not drawn, and the RGB value of the character portion becomes that of a white color (i.e., R=G=B=255). The pixel value of the pixel corresponding to the character attribute thus becomes R=255. In step S2003, the host PC 200 performs reduction processing so that the average value of the value of the four pixels, i.e., two pixels by two pixels before performing reduction processing, becomes the value of one pixel after performing reduction processing. According to the example illustrated in FIG. 14A, the R values of each of the pixels in the low-resolution color image become 138, 177, 100, and 216, respectively. Further, the value of the character portion in the character image page buffer 2013Ta becomes 1, and the value of a non-character portion becomes 0.

As described above, if reduction processing is performed without drawing the character pixels, the R value after performing reduction processing becomes higher than the R value of the color image before performing reduction processing. As a result, the density of the image finally printed on the printing medium becomes that of a light color. Further, the density of image to be printed is different depending on the number of character pixels included among the four pixels which are to be reduction-processed. The lightness of the color thus becomes different depending on a location, and the color becomes light locally around the characters.

According to the above-described comparison example, the pixel value of the character attribute pixel is that of the white color. However, the pixel value of the character portion in the color image page buffer may be directly used (e.g., if the character is a black character, R=G=B=0). In such a case, if reduction processing is simply performed as in the above-described method, the R values of each of the pixels become 75, 50, 100, and 25, respectively. The R values thus become lower than the original R value (i.e., 100). In other words, the color of the image printed as a result becomes darker than the color of the color image before performing reduction processing.

As described above, when reduction processing is performed on the color image, the color of the color image around the character image changes. To solve such a problem, according to the present exemplary embodiment, when reduction processing is to be performed, the character attribute pixel is not included in pixel value calculation for performing reduction processing. It can thus prevent the image degradation in which the character quality level is lowered according to the color change around the character. Such a method will be described in detail below with reference to FIG. 15.

Figure 15:
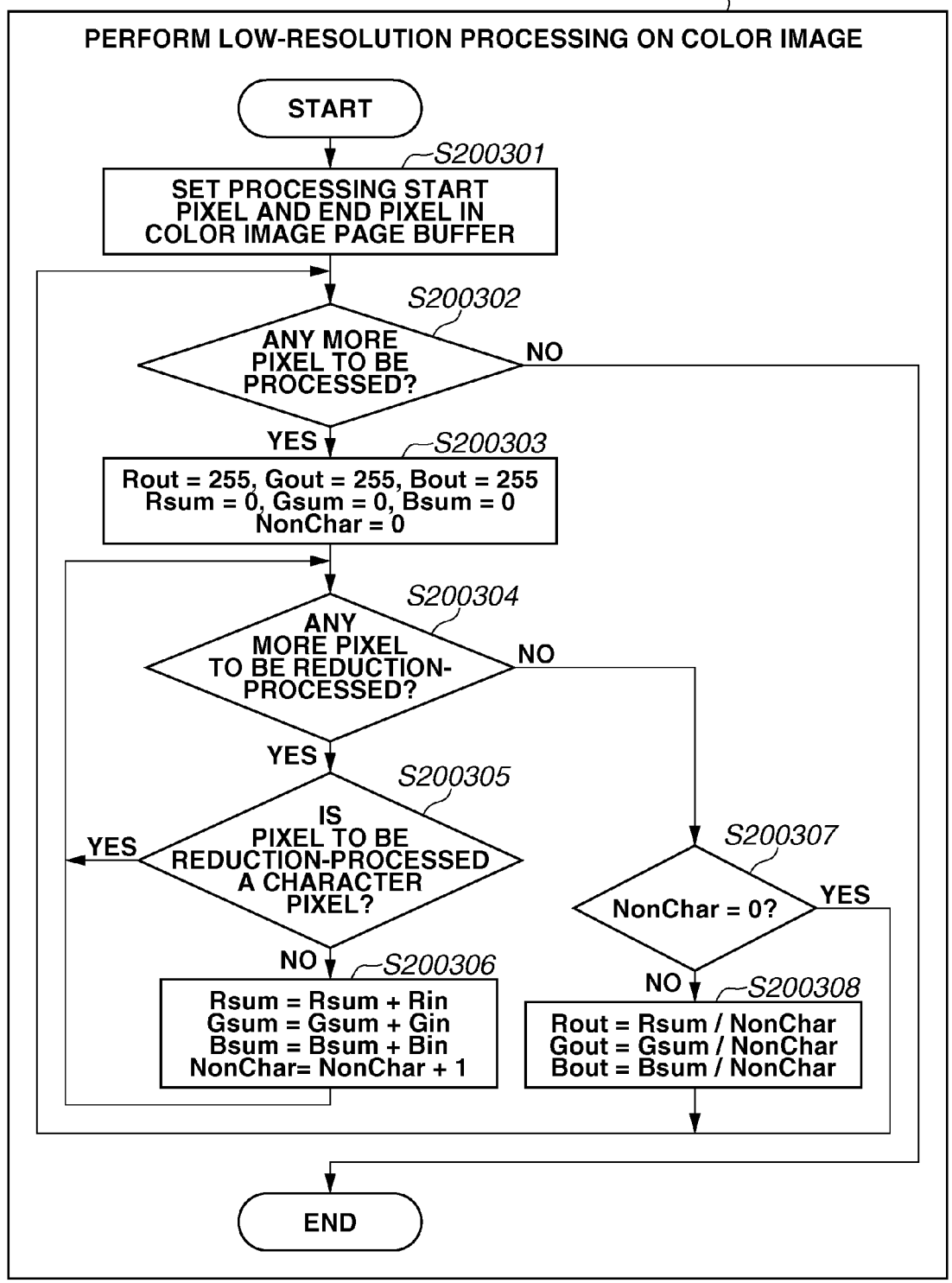
FIG. 15 is a flowchart illustrating reduction processing performed according to the first exemplary embodiment.

FIG. 15 is a flowchart illustrating reduction processing performed in step S2003 of the flowchart illustrated in FIG. 4 according to the present exemplary embodiment. In step S200301, the host PC 200 sets the processing start pixel and the processing end pixel in the color image page buffer. In step S200302, the host PC 200 determines whether processing has been performed on all pixels. If there is any more pixel to be processed (YES in step S200302), the process proceeds to step S200303 to perform processing on the subsequent pixel. If there is no more pixel to be processed (NO in step S200302), the process ends. In step S200303, the host PC 200 sets as output initial values Rout=255, Gout=255, Bout=255, and white color. Further, the host PC 200 sets initial values Rsum=0, Gsum=0, and Bsum=0 to pixel accumulation values for calculating the output values. Furthermore, the host PC 200 sets an initial value Non-Char=0 to a counter for counting the number of color pixels.

In step S200304, the host PC 200 confirms whether the processes of steps S200305 and S200306 have been performed on all pixels to be reduction-processed (i.e., four pixels in the case of ½ by ½ reduction). If there is no more pixel to be reduction-processed (NO in step S200304), the process proceeds to step S200307. If there is any more pixel to be reduction-processed (YES in step S200304), the process proceeds to step S200305. In step S200305, the host PC 200 determines whether the pixel to be reduction-processed is a character attribute pixel (i.e., a character pixel). If the pixel is the character pixel (YES in step S200305), the host PC 200 ends processing of the present pixel, and the process returns to step S200304. If the pixel is not the character pixel, i.e., is the color image pixel (NO in step S200305), the process proceeds to step S200306.

In step S200306, the host PC 200 obtains the pixel values of the pixel to be reduction-processed (i.e., Rin, Gin, Bin), and adds to the pixel accumulation values using equation (1) as follows.

$$R\text{sum}=R\text{sum}+R\text{in}$$

$$G\text{sum}=G\text{sum}+G\text{in}$$

$$B\text{sum}=B\text{sum}+B\text{in} \quad (1)$$

Further, the host PC 200 increments the color pixel counter by one as in the following equation (2).

$$\text{NonChar}=\text{NonChar}+1 \quad (2)$$

The process then returns to step S200304 for processing the subsequent pixel.

In step S200307, the host PC 200 determines whether the color image counter NonChar is 0. If the color pixel counter value is 0 (YES in step S200307), it indicates that all of the plurality of pixels to be reduction-processed are character pixels. In such a case, the host PC 200 sets the white pixel values (255, 255, 255), i.e., the initial values, to the respective pixel output values (Rout, Gout, Bout), and ends processing the present pixel. The process then returns to step S200302. If the color pixel counter value is not 0 (NO in step S200307), the process proceeds to step S200308. In step S200308, the host PC 200 calculates the output pixel value (Rout, Gout, Bout) by dividing the pixel accumulation value by the value of the color pixel counter as in equation (3).

$$R\text{out}=R\text{sum}/\text{NonChar}$$

$$G\text{out}=G\text{sum}/\text{NonChar}$$

$$B\text{out}=B\text{sum}/\text{NonChar} \quad (3)$$

As described above, the average value of only the values of the color image pixels can be calculated without including the values of the character pixels. The host PC 200 ends processing of the present pixel, and the process returns to step S200302.

FIG. 14B illustrates the result of the reduction processing performed as illustrated in FIG. 15 according to the present exemplary embodiment. Referring to FIG. 14B, an input image page buffer 2021b is the same as the input image page buffer 2021a, so that description will be omitted. Further, FIG. 14B illustrates a color image page buffer 2023b and a character image page buffer 2023Tb. When the host PC 200 separates the color image and the character image in step S2002 of the flowchart illustrated in FIG. 4, the host PC 200 draws the information indicating that the character portion in the color image page buffer 2023b is a character image portion. According to the example illustrated in FIG. 14B, such character portion is marked by a cross (x). However, other methods may be employed, such as setting a negative number (e.g., −1), using a specific value (e.g., 256), or separately referring to the information on the character image page buffer. If the host PC 200 then performs reduction processing according to the flowchart illustrated in FIG. 15 using such a method, the R values in each of the pixels in a reduction-processed low-resolution color image page buffer 2024b become 100, 100, 100, 100. The R value of the color image pixel before performing reduction processing can thus be maintained, and an image in which there is no change in the color can be obtained.

As described above, the character attribute pixels are not included in the calculation of the pixel values for performing reduction processing. As a result, it can prevent the color for each pixel from drastically changing after performing reduction processing according to the number of character pixels included in the plurality of pixels (four pixels in the above-described example) to be reduction-processed. Image degradation caused by an area around the characters becoming light or dark can thus be prevented.

When performing reduction processing, it is desirable for a reduction rate to be one fraction of an integer. If the reduction rate is not such a value, periodic noise such as a moiré is generated. Further, after the data is transferred to the printer 100, the data can be enlarged by an integral multiple in an quantization process performed in step S1004. A desirable resulting image quality can thus be obtained by performing simple processing. It is further desirable for the reduction rate to be one fraction of a power of two. In such a case, the average value can be calculated by performing bit shift processing without performing division, so that the average value can be calculated at high speed.

The process in which the host PC 200 compresses the data and transmits the compressed data to the printer 100, and the process then performed by the printer 100 according to the flowchart illustrated in FIG. 4 will be described below.

In step S2004, the host PC 200 performs lossy compression on the low-resolution color image. According to the present exemplary embodiment, the compression method defined by the Joint Photographic Experts Group (JPEG) is employed. However, any compression method may be used. Since deterioration of the details is originally less noticeable as compared to the characters, lossy compression is selected for the low-resolution color image. Further, when the printer using a line head performs full-color printing, there is a case where a printing position deviates between the colors. It may thus become difficult to maintain the resulting image quality level even when accuracy of the data is pursued.

It is not necessary to perform compression for implementing exemplary embodiments of the present disclosure. More specifically, since the number of pixels in the color image data is reduction-processed to ½ in both the horizontal and vertical directions by performing the above-described low-resolution processing (i.e., reduction processing), the data amount has at least become ¼ thereby. There may thus be cases where it is not necessary to perform further compression depending on a balance between a print speed and a transfer speed.

Further, if the number of pixels in the color image data is reduction-processed to ⅓ in both the horizontal and vertical directions, the data amount becomes ⅑, and if the number of pixels in the color image data is reduction-processed to ¼ in both the horizontal and vertical directions, the data amount becomes 1/16. The data amount can thus be further reduced.

In step S2005, the host PC 200 performs lossless compression of the character data generated in step S2002. According to the present exemplary embodiment, a Run Length (RL) compression method is employed. However, any compression method may be used. Lossless compression is selected for the following reasons. Reproducibility of the details is originally used for the character image as compared to the color image. Further, lossless compression reduces the effect of the printing position deviation between the colors which is generated when a plurality of colors of ink is used to print the character. As a result, if the accuracy of the data is to be pursued, the resulting image quality level is prevented from becoming lowered by performing lossless compression. Furthermore, it is not necessary to perform the compression process, similarly to the process of step S2004. There may thus be cases where it is not necessary for the entire print system to perform further compression, depending on the balance between the print speed and the transfer speed.

In step S2006, the host PC 200 transmits to the printer 100 the compressed low-resolution color image data and character data. As described above, the host PC 200 transfers to the printer 100 the low-resolution color image data obtained by performing reduction processing and the character data on which reduction processing has not been performed. The data amount can thus be greatly reduced without lowering the character quality level. Further, since the color image data and the character data are separate data, the compression method appropriate for each data is applicable to the data.

In step S1001, the printer 100 receives from the host PC 200 the compressed low-resolution color image data and character data. In step S1002, the printer 100 decompresses the compressed low-resolution color image data received in step S1001, and in step S1005, the printer 100 decompresses the compressed character data received in step S1001. If the host PC 200 has not compressed the data, the printer 100 skips step S1002 and proceeds to step S1003 with respect to the low-resolution color image data, and skips S1005 and proceeds to step S1006 with respect to the character data.

In step S1002, the printer 100 decompresses the color image which has been lossy-compressed to generate the low-resolution color image data. The decompression method performed in step S1002 corresponds to the lossy compression method performed in step S2004 by the host PC 200. According to the present exemplary embodiment, the printer 100 decodes the data which has been JPEG-compressed. The decoded data is of the same format as the low-resolution color image buffer 2024 illustrated in FIG. 10, and is stored in a low-resolution color image buffer (not illustrated) in the RAM 212 of the printer 100.

In step S1003, the printer 100 performs ink color separation processing, i.e., converts the low-resolution color image data decompressed in step S1002 to the multi-valued CMYK image data corresponding to the ink colors. Each pixel value (i.e., RGB value) in the low-resolution color image data is the data indicating the color coordinates (R, G, B) in the color space coordinate system such as the sRGB, i.e., the expression color of the monitor. The printer 100 uses known methods such as matrix calculation and a process employing a three-dimensional look-up table (LUT) to convert such data to the multi-valued density data corresponding to the ink colors of the printer (i.e., C, M, Y, and K). According to the present exemplary embodiment, the printer 100 uses C, M, Y, and K inks, so that the printer 100 converts the image data of an RGB signals to the image data including C, M, Y, and K color signals of eight bits each. Further, according to the present exemplary embodiment, the printer 100 uses inks of four colors, i.e., C, M, Y, and K colors. However, inks of other colors may be added, such as light cyan (Lc), light magenta (Lm), and gray (Gy), which are of less density, for improving the image quality.

In step S1004, the printer 100 performs quantization of the low-resolution CMYK image data corresponding to the color image portion to generate the CMYK image print data. Any quantization method may be used, such as an error diffusion method and a dither method.

Figure 13A:
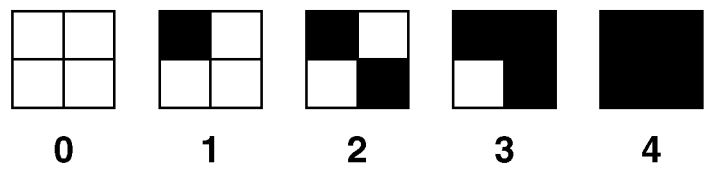
FIGS. 13A and 13B illustrate quantization processing.
Figure 13B:
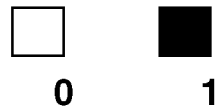

FIGS. 13A and 13B illustrate the quantization process performed according to the present exemplary embodiment. FIG. 13A illustrates an example of quantization patterns employed when the printer 100 quantizes each of the data corresponding to the respective CMYK ink colors in step S1004. According to the present exemplary embodiment, the same quantization pattern is consistently used for all ink colors. However, a different pattern may be used for each ink color, or control may be performed so that the different quantization pattern is used for each pixel position, for improving the image quality. Further, according to the present exemplary embodiment, the printer 100 generates binary dot data corresponding to black and white, i.e., discharging or not discharging a ink droplet, for each pixel. However, if the gradation is to be less than that of the multi-valued CMYK image data generated in step S1003, the generated data is not limited to the binary data. Furthermore, according to the present exemplary embodiment, the number of pixels becomes twice that of the low-resolution CMYK ink color data buffer in both the horizontal and vertical directions, and each ink color data is quantized to five levels of two by two pixels. Such a rate is determined corresponding to the reduction rate employed by the host PC 200 when performing low-resolution processing in step S2003.

In step S1005, the printer 100 decompresses the lossless-compressed character image to generate the character data. The decompression method employed corresponds to the lossless compression method employed in step S2005 by the host PC 200. According to the present exemplary embodiment, the printer 100 decodes the data which has been RL-compressed. The decoded data is stored in a character image page buffer (not illustrated) in the RAM 212 of the printer 100.

In step S1006, the printer 100 converts the character data to the multi-valued CMYK character data. The conversion method is similar to the method for converting the color image data to the CMYK image data employed in step S1003.

In step S1007, the printer 100 quantizes the CMYK character data to generate the CMYK print data. Any quantization method may be used, such as the error diffusion method and the dither method, similarly as in step S1004. It is desirable in both steps S1004 and S1007 to employ the dither method instead of the error diffusion method as the quantization method because of the following reason. The error diffusion method distributes to surrounding pixels the error occurring as a result of quantization. However, if the color image portion and the character image portion are separately quantized according to the present exemplary embodiment, the error may not be appropriately propagated. For example, if the boundary portion of the color image portion and that of the character image portion are alternately repeated, the error of the color image portion may be propagated to the character portion, or the opposite may occur.

In step S1008, the printer 100 combines the image print data generated in step S1004 and the character print data generated in step S1007 to generate the combined print data. More specifically, the printer 100 implements a logical OR operation on the data corresponding to the same pixels in each of the CMYK print data of the image print data and the character print data to generate the CMYK combined print data.

In step S1009, the printer 100 controls driving of the printing heads 101, 102, 103, and 104 illustrated in FIG. 1 based on the CMYK combined print data to print the image on the printing medium. According to the present exemplary embodiment, the CMYK combined print data is the data indicating application of the ink droplets, and is the binary data indicating discharging or not discharging the ink droplets.

As described above, according to the present exemplary embodiment, the host PC 200 separates the character image portion indicating the character attribute and the color image portion indicating the image attribute to generate the character data and the color image data (i.e., print data) (i.e., first generation). The host PC 200 then compresses each of the character data and the color image data, and transfers the compressed data to the printer 100. The printer 100 performs decompression, the ink color separation processing, and quantization processing on the received data to generate the character print data indicating the character attribute (i.e., first dot data) and the color print data (i.e., second dot data) (i.e., second generation). The printer 100 then combines the character print data and the color print data to generate the combined print data for applying the ink (i.e., third dot data) (i.e., third generation).

According to the present exemplary embodiment, the host PC 200 performs low-resolution processing on the color image data corresponding to the color image portion before transferring the data to reduce the transfer data amount. When the host PC 200 performs low-resolution processing, the host PC 200 generates the low-resolution color image data which has been reduction-processed, based on the attribute and the pixel value of each of the plurality of pixels to be reduction-processed. According to the present exemplary embodiment, the host PC 200 sets the ratio of using the pixel value of the character attribute pixel to be smaller than the ratio of using the pixel value of the color attribute pixel. More specifically, the ratio of the pixel value of the character attribute pixel to be used in performing the calculation is set to 0, and the ratio of the pixel value of the color attribute pixel to be used in performing the calculation is set to 1. By performing such a process, the pixel value of the character data is prevented from affecting the pixel value of the color image portion surrounding the character portion. As a result, the change in the color of the image attribute pixels surrounding the character resulting from the reduction processing is reduced, and the character quality level can be maintained. Further, the data amount can be reduced by performing the reduction processing.

According to the first exemplary embodiment, the character data and the color image data are generated and processed for separating the character image portion and the color image portion (i.e., image portion). According to the second exemplary embodiment of the present disclosure, the black character and the color image other than the black character are separated and processed. The methods other than the process to be described below are similar to those of the first exemplary embodiment.

According to the present exemplary embodiment, in step S2002 of the flowchart illustrated in FIG. 4, the host PC 200 determines as follows. If the object to be drawn is not a bitmap image, and R=G=B=0, the host PC 200 determines that the pixel corresponds to a black character object.

Figure 9:
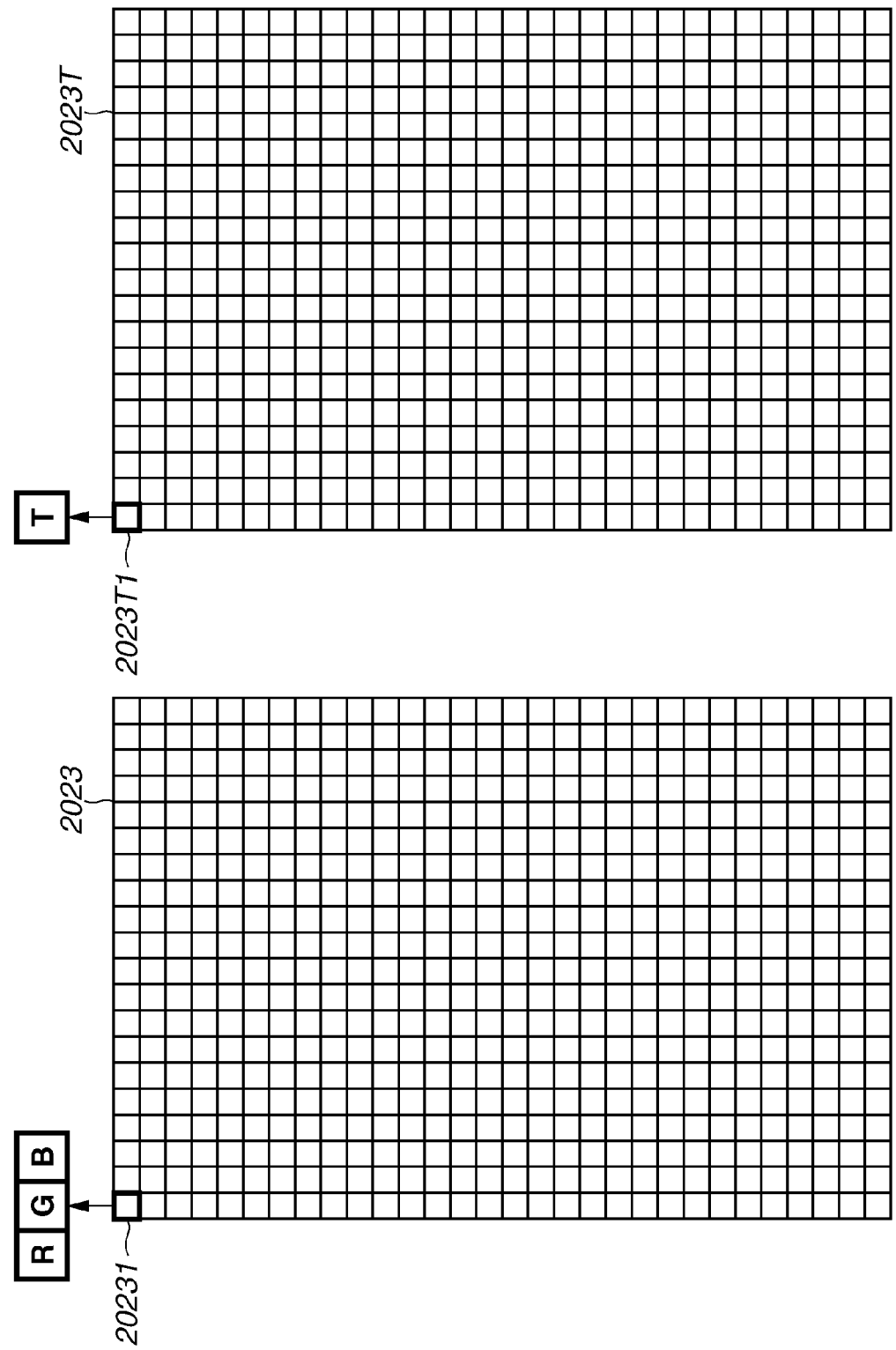
FIG. 9 illustrates a color image page buffer and a character image page buffer.

FIG. 9 illustrates the color image page buffer and the character image page buffer used when separating the black character and the color image other than the black character. Referring to FIG. 9, a color image page buffer 2023 and a character image page buffer 2023T have regions of the same number of pixels in the horizontal direction and the vertical direction as the input image page buffer, and include top pixels 20231 and 2023T1, respectively. Each pixel in the color image page buffer 2023 includes the RGB value, and each pixel in the character image page buffer 2023T includes black character information T. In such a case, in step S20024 of the flowchart illustrated in FIG. 6, the host PC 200 sets the color information to the RGB region in each pixel in the color image page buffer 2023. Further, in step S20025, the host PC 200 sets the black character information T to each pixel in the character image page buffer 2023T. Since the RGB value of the black character is R=G=B=0, the size of the character image page buffer 2023T can be reduction-processed to one bit.

Figure 11:
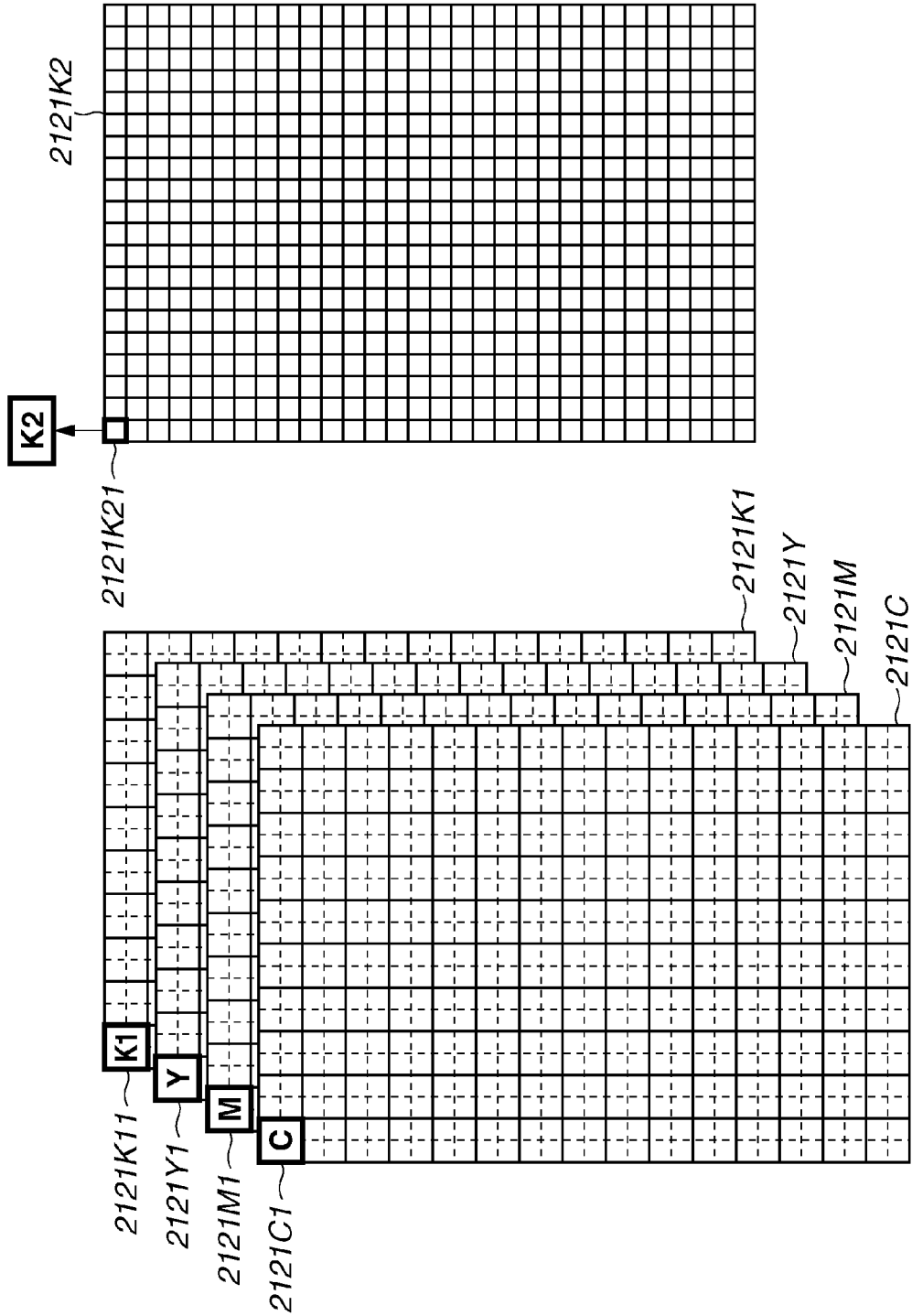
FIG. 11 illustrates low-resolution C, M, Y, and K ink color density buffers for the color image portion, and the K ink color buffer for the character portion.

FIG. 11 illustrates examples of a low-resolution CMYK ink color density buffers for the color image portion and a K ink color buffer for the black character portion, set in the RAM 212 of the printer 100 in step S1003 of the flowchart illustrated in FIG. 4. Referring to FIG. 11, the low-resolution CMYK ink color density buffer for the color image portion includes the following four buffers, i.e., a low-resolution C ink color density buffer 2121C, a low-resolution M ink color density buffer 2121M, a low-resolution Y ink color density buffer 2121Y, and a low-resolution K ink color density buffer 2121K1. The low-resolution C ink color density buffer 2121C includes a top pixel 2121C1, and each pixel therein indicates a density value of the C ink color. Similarly, the low-resolution M ink color density buffer 2121M includes a top pixel 2121M1, and each pixel therein indicates the density value of the M ink color. The low-resolution Y ink color density buffer 2121Y includes a top pixel 2121Y1, and each pixel therein indicates the density value of the Y ink color. The low-resolution K ink color density buffer 2121K1 includes a top pixel 2121K11, and each pixel therein indicates the density value of the K1 ink color.

The above-described four ink color buffers have the regions of the same number of pixels in the horizontal direction and the vertical direction as the low-resolution color image page buffer 2024 illustrated in FIG. 10, and each pixel indicates eight-bit multi-valued information. The pixels of each ink color buffer correspond to the pixels of low-resolution color image page buffer 2024 in one-to-one relation. For example, in step S1003 of the flowchart illustrated in FIG. 4, the printer 100 converts the RGB value in the top pixel 20241 in the low-resolution color image page buffer 2024 to the ink colors. The printer 100 then stores the conversion result in the top pixels 2121C1, 2121M1, 2121Y1, and 2121K11.

Figure 12:
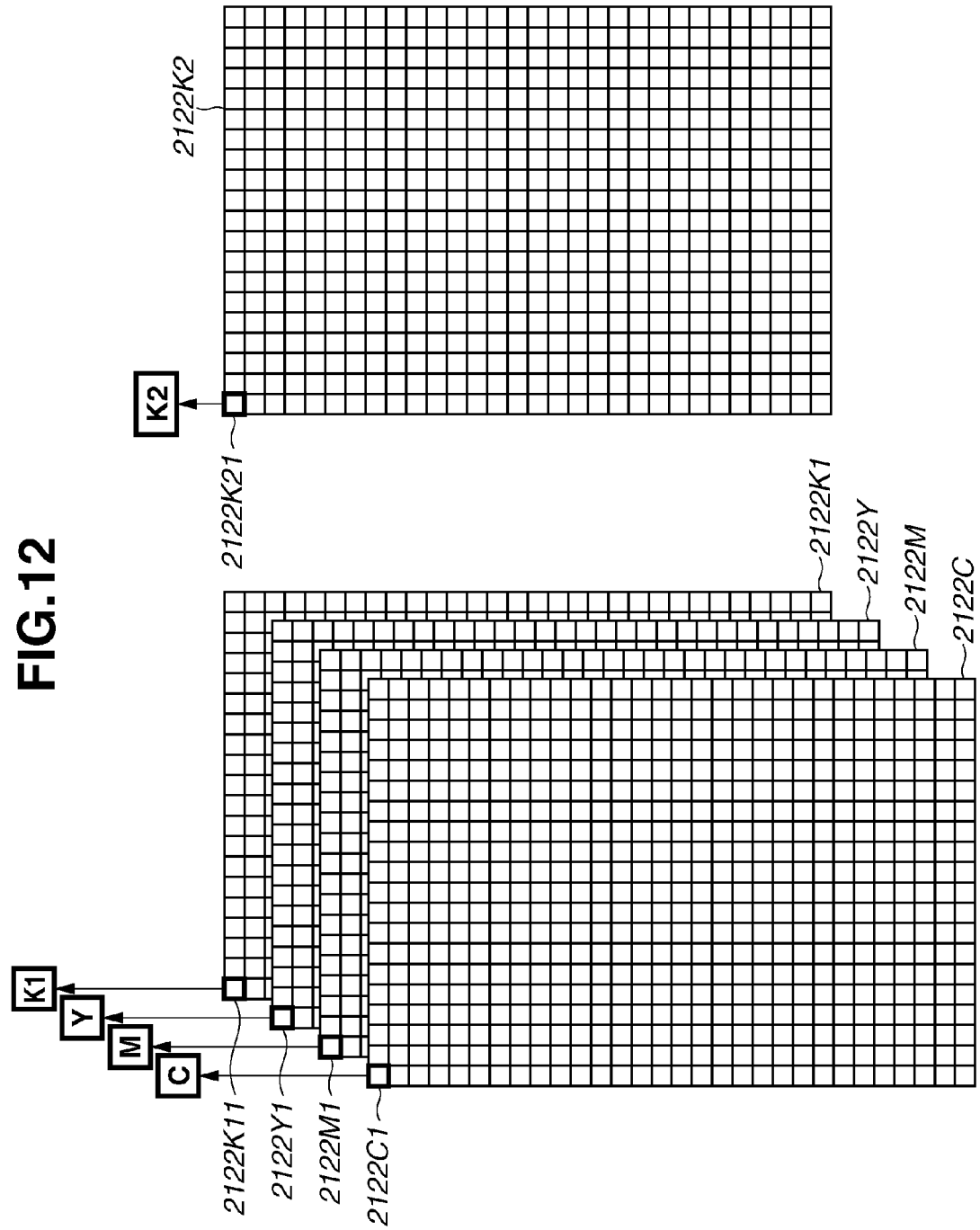
FIG. 12 illustrates C, M, Y, and K print data buffers for the color image portion and a K print data buffer for the character portion.

FIG. 12 illustrates examples of CMYK print data buffers for the color image portion and a K print data buffer for the black character portion set in the RAM 212 of the printer 100 in step S1004 of the flowchart illustrated in FIG. 1. Referring to FIG. 12, the CMYK print data buffers for the color image portion includes the following four ink color buffers, i.e., a C print data buffer 2122C, an M print data buffer 2122M, a Y print data buffer 2122Y, and a K print data buffer 2122K1. The C print data buffer 2122C includes a top pixel 2122C1, and each pixel includes the information indicating whether to discharge or not discharge the cyan ink droplet. Similarly, the M print data buffer 2122M includes a top pixel 2122M1, and each pixel includes the information indicating whether to discharge or not discharge the magenta ink droplet. The Y print data buffer 2122Y includes a top pixel 2122Y1, and each pixel includes the information indicating whether to discharge or not discharge the yellow ink droplet. The K print data buffer 2122K1 includes a top pixel 2122K11, and each pixel includes the information indicating whether to discharge or not discharge the black ink droplet. The above-described four print data buffers have regions of the same number of pixels in the horizontal direction and the vertical direction as the input image page buffer 2021 illustrated in FIG. 7.

Further, in step S1006 of the flowchart illustrated in FIG. 4, the printer 100 converts the character data to the multi-valued data corresponding to each of the C, M, Y, and K ink colors. In such a case, since the character data of the black character is data indicating that R=G=B=0, the data to be converted is the data of only the black (K) ink. The ink for printing the black character is not limited to only the black color, and Gy and light gray (LGy) of lower density may also be used.

FIG. 11 illustrates a K ink color buffer 2121K2 for the black character portion. The K ink color buffer 2121K2 has a region of the same number of pixels in the horizontal direction and the vertical direction as the input image page buffer, and includes a top pixel 2121K21. Further, each of the pixels in the black character image buffer 2023T illustrated in FIG. 9 includes a black ink value K2. Since the pixels therein correspond one to one, in step S1006, the printer 100 converts the black character information T in the top pixel 2023T1 in the black character image page buffer 2023T to the K ink color data. The printer 100 then stores the conversion result in the top pixel 2121K21 of the K ink color buffer 2121K2. The black character information T is the binary data while the K ink color data after conversion is eight-bit multi-valued data. As described above, the density of the K ink of the black character portion is controlled using the multi-valued data, so that the ink application amount can be appropriately controlled according to the type of the printing medium.

Further, FIG. 12 illustrates a K print data buffer 2122K2 for the black character portion. The K print data buffer 2122K2 has a region of the same number of pixels in the horizontal direction and the vertical direction as the K ink color buffer 2121K2 for the black character portion, and includes a top pixel 2122K21. According to the present exemplary embodiment, in step S1007 of the flowchart illustrated in FIG. 4, the printer 100 quantizes the CMYK character data. In such a case, the printer 100 quantizes the data to the binary data of one by one pixel (i.e., 0 or 1) as illustrated in FIG. 13B. One pixel of the print data buffer thus corresponds to discharging or not discharging an ink droplet from the printing head.

Furthermore, according to the present exemplary embodiment, in step S1008 of the flowchart illustrated in FIG. 4, the printer 100 combines the data as follows. A combined print data buffer is configured similarly to the CMYK print data buffer for the color image portion illustrated in FIG. 12. The printer 100 implements the logical OR operation on the K print data in the K print data buffer for the color image portion and the K print data in the K print data buffer for the black character illustrated in FIG. 12 to generate the K print data of the combined CMYK print data. In such a case, the C, M, and Y print data in the combined CMYK print data have the same values as the C, M, and Y print data in the image print data generated in step S1004, respectively. However, it is not necessary for the C, M, and Y print data in the combined CMYK print data to be the same as the C, M, and Y print data in the image print data generated in step S1004, respectively. For example, the K print data of the black character portion may be printed in addition to the CMY print data of the color portion at the boundary area between the black character portion and the color portion, depending on the reduction rate of the color image portion. In such a case, the ink bleeding may occur so that the image becomes blurred, and the image quality may thus be degraded. To solve such a problem, the printer 100 implements a logical AND operation between the negation of the K print data for the black character and the CMY print data for the color image portion. The printer 100 thus generates each of the C, M, and Y print data in the CMYK combined print data and prevents ink bleeding. In such a case, the printer 100 may perform the above-described process on all of the C, M, and Y inks. Further, the printer 100 may perform the above-described process on only the ink (e.g., yellow ink) of which a color difference with a base color of the printing medium (i.e., paper white) is small.

As described above, according to the present exemplary embodiment, a pixel which is an object of the character attribute and the color thereof is black (R=G=B=0) is determined as a character attribute pixel. The pixels of the color image portion other than the character attribute pixels are determined as the pixels of the image attribute, and are separated from the character attribute pixel. The data amount of one pixel in the character data of the black character is one bit, which is smaller than the data amount of one pixel of the input image data, i.e., 24 bits. As a result, the data amount of the character data can be caused to be smaller than the data amount of the input image data while the resolutions thereof are the same. The data amount is eight bits even in the case where a pixel in which R=G=B is determined as the black character pixel, so that the data amount of the character data can be caused to be smaller than the data amount of the input image data. By performing such a process, the color of the color image surrounding the character can be prevented from becoming light, the blur caused by ink bleeding can be prevented, and the data amount can be reduced.

According to the first exemplary embodiment, when performing low-resolution processing, the pixel value of the pixel indicating the character attribute is not considered in calculating (i.e., not included in the calculation of) the pixel value after performing resolution processing. According to a third exemplary embodiment, other calculation methods will be described below.

FIG. 16 is a flowchart illustrating the process according to the present exemplary embodiment. According to the present exemplary embodiment, the calculation is performed by replacing the value of the pixel indicating the character attribute with the value calculated from the pixel values of the pixels indicating the color pixel attribute.

In step S200311, the host PC 200 sets the processing start pixel and the processing end pixel in the color image page buffer. In step S200312, the host PC 200 determines whether processing has been performed on all pixels. If there is any more pixel to be processed (YES in step S200312), the process proceeds to step S200313 to perform processing on the subsequent pixel. If there is no more pixel to be processed (NO in step S200312), the process ends. In step S200313, the host PC 200 sets the output values to the white color (RnonChar=255, GnonChar=255, BnonChar=255). Further, the host PC 200 sets the initial values of pixel accumulation values for calculating the output values to Rsum=0, Gsum=0, and Bsum=0. Furthermore, the host PC 200 sets the counter for counting the number of character pixels to an initial value NumChar=0.

In step S200314, the host PC 200 confirms whether the processes of steps S200315 to S200317 have been performed on all pixels to be reduction-processed (i.e., four pixels in the case of ½ by ½ reduction). If there is no more pixel to be reduction-processed (NO in step S200314), the process proceeds to step S200319. If there is any more pixel to be reduction-processed (YES in step S200314), the process proceeds to step S200315. In step S200315, the host PC 200 determines whether the pixel to be reduction-processed is a pixel indicating the character attribute. If the pixel indicates the color pixel attribute (NO in step S200315), the process proceeds to step S200316. If the pixel is the character pixel (YES in step S200315), the process proceeds to step S200317.

In step S200316, the host PC 200 obtains the pixel values of the pixel to be reduction-processed (i.e., Rin, Gin, Bin), and adds to the pixel accumulation values as follows.

$$R\text{sum}=R\text{sum}+R\text{in}$$

$$G\text{sum}=G\text{sum}+G\text{in}$$

$$B\text{sum}=B\text{sum}+B\text{in} \qquad (4)$$

The process then returns to step S200314 for processing the subsequent pixel. On the other hand, in step S200317, the host PC 200 adds one to the character pixel counter as follows.

$$\text{NumChar}=\text{NumChar}+1 \qquad (5)$$

The process then returns to step S200314 for processing the subsequent pixel. If there is no more pixel to be processed (NO in step S200314), the process proceeds to step S200319. In step S200319, the host PC 200 determines whether the number of pixels to be reduction-processed is not equal to the character pixel counter value, i.e., NumPix≠NumChar. If NumPix≠NumChar (NO in step S200319), the process proceeds to step S200320. In step S200320, the host PC 200 calculates the pixel values for replacing the character pixel. More specifically, the host PC 200 obtains the average pixel values of pixels other than the character pixels in the pixels reduction-processed.

$$R\text{nonChar}=R\text{sum}/(\text{NumPix}-\text{NumChar})$$

$$G\text{nonChar}=G\text{sum}/(\text{NumPix}-\text{NumChar})$$

$$B\text{nonChar}=B\text{sum}/(\text{NumPix}-\text{NumChar}) \qquad (6)$$

In step S200318, the host PC 200 calculates the output pixel values (Rout, Gout, Bout) as follows. The value obtained by multiplying the replacing pixel value by the character pixel counter value is added to the pixel accumulation value, and the sum is divided by the number of pixel to be reduction-processed, i.e., NumPix.

$$R\text{out}=(R\text{sum}+(R\text{nonChar}*\text{NumChar}))/\text{NumPix}$$

$$G\text{out}=(G\text{sum}+(G\text{nonChar}*\text{NumChar}))/\text{NumPix}$$

$$B\text{out}=(B\text{sum}+(B\text{nonChar}*\text{NumChar}))/\text{NumPix} \qquad (7)$$

If NumPix=NumChar (YES in step S200319), i.e., the pixels to be reduction-processed are all characters, the process becomes as indicated by equation (8).

$$\text{NumChar}=\text{NumPix}$$

$$R\text{sum}=G\text{sum}=B\text{sum}=0$$

$$R\text{nonChar}=R\text{nonChar}=R\text{nonChar}=255 \qquad (8)$$

As a result, Rout=Gout=Bout=255, i.e., the pixel value becomes that of the white color. The process performed on the pixel ends, and the process returns to step S200312.

According to the above-described process, the pixel value of the character attribute pixel among the pixels to be reduction-processed is replaced with the average pixel values of the color pixel attribute pixel among the pixels to be reduction-processed. A value other than the average value may be set as the value to replace the pixel value of the character attribute pixel. For example, the pixel value of the character attribute pixel among the pixels to be reduction-processed may be replaced by the pixel value of the color pixel attribute pixel which has been last detected.

Further, the replacing pixel value may be preset instead of calculating when performing reduction processing. For example, if the host PC 200 determines, when separating the character portion and the color image portion in step S2002 of the flowchart illustrated in FIG. 4, that a pixel is of the character attribute, the host PC 200 may perform as follows. The host PC 200 may copy to the color image buffer the pixel value of the pixel immediately before the pixel being processed which indicates the color pixel attribute.

A similar result to the above-described exemplary embodiment can be obtained by performing as follows. When performing low-resolution processing of the color image portion, a ratio of the pixel value of the character attribute pixel to the pixel value to be generated is caused to be less than that of the pixel value of the color pixel attribute pixel.

FIG. 17 is a flowchart illustrating the process for causing the ratio of the character pixel to be lower than that of the pixel value of the color pixel attribute pixel. In step S200321, the host PC 200 sets the processing start pixel and the processing end pixel in the color image page buffer. In step S200322, the host PC 200 determines whether processing has been performed on all pixels. If there is any more pixel to be processed (YES in step S200322), the process proceeds to step S200323 to perform processing on the subsequent pixel. If there is no more pixel to be processed (NO in step S200322), the process ends. In step S200323, the host PC 200 sets the output initial values of pixel accumulation values for calculating the output values to Rsum=0, Gsum=0, and Bsum=0. Further, the host PC 200 sets the ratio of the color pixel to ColDeg=1.0, and the ratio of the character pixel to CharDeg=0.5. Furthermore, the host PC 200 sets the number of pixels to be reduction-processed as NumPix=4. In step 520324, the host PC 200 confirms whether the processes of steps S200325 to S200327 have been performed on all pixels to be reduction-processed (i.e., four pixels in the case of ½ by ½ reduction). If there is no more pixel to be reduction-processed (NO in step S200324), the process proceeds to step S200328. If there is any more pixel to be reduction-processed (YES in step S200324), the process proceeds to step S200325. In step S200325, the host PC 200 determines whether the pixel to be reduction-processed is a pixel indicating the character attribute. If the pixel indicates the color pixel attribute (NO in step S200325), the process proceeds to step S200326. If the pixel is the character pixel (YES in step S200325), the process proceeds to step S200327.

In step S200326, the host PC 200 obtains the color pixel value of the pixel to be reduction-processed (i.e., RinCol, GinCol, BinCol), and adds the product of the obtained color pixel value and the ratio of the color pixel to the pixel accumulation values.

$$R\text{sum}=R\text{sum}+\text{ColDeg}*R\text{inCol}$$

$$G\text{sum}=G\text{sum}+\text{ColDeg}*G\text{inCol}$$

$$B\text{sum}=B\text{sum}+\text{ColDeg}*B\text{inCol} \qquad (9)$$

The process then returns to step S200324 for processing the subsequent pixel. In step S200327, the host PC 200 obtains a character pixel value of the pixel to be reduction-processed (i.e., RinChar, GinChar, BinChar). The host PC 200 then adds to the pixel accumulation value the product of the obtained character pixel value and the ratio of the character pixel.

$$R\text{sum}=R\text{sum}+\text{CharDeg}*R\text{inChar}$$

$$G\text{sum}=G\text{sum}+\text{CharDeg}*G\text{inChar}$$

$$B\text{sum}=B\text{sum}+\text{CharDeg}*B\text{inChar} \quad (10)$$

The process then returns to step S200324 for processing the subsequent pixel. If the processes have been performed on all pixels (No in step S200324), the process proceeds to step S200328. In step S200328, the host PC 200 divides the pixel accumulation value by the number of pixels to be reduction-processed to obtain the average value of the pixels to be reduction-processed, and thus calculates the output pixel value (Rout, Gout, Bout) (refer to equation 11).

$$R\text{out}=R\text{sum}/\text{NumPix}$$

$$G\text{out}=G\text{sum}/\text{NumPix}$$

$$B\text{out}=B\text{sum}/\text{NumPix} \quad (11)$$

In the above-described process, the ratio of the color pixel and the ratio of the character pixel are set when performing reduction processing. However, the ratio of the color pixel and the ratio of the character pixel may be preset. In such a case, when the host PC 200 separates the character portion and the color image portion in step S2002 of the flowchart illustrated in FIG. 4, the host PC 200 may multiply the pixel value of the color pixel attribute pixel and that of the character attribute pixel by respective degrees of contribution.

As described above, according to the present exemplary embodiment, when reduction processing for generating the low-resolution color image data is performed, the low-resolution color image data after reduction is generated based on the attribute and the pixel value of each of the plurality of pixels to be reduction-processed. More specifically, the ratio of using the pixel value of the character attribute pixel (i.e., 0.5 according to the present exemplary embodiment) is caused to be smaller than the ratio of using the pixel value of the color attribute pixel (i.e., 1 according to the present exemplary embodiment). As a result, the change in the color at the boundary between the character portion and the color image portion can be reduced.

According to a fourth exemplary embodiment of the present disclosure, the character portion image is generated by extracting the character portion from the input image data, and the input image and the character portion image are then processed. FIG. 20 is a flowchart illustrating the process according to the present exemplary embodiment. According to the present exemplary embodiment, the host PC and the inkjet printer are respectively the host PC 200 and the printer 100 illustrated in FIG. 3.

The host PC 200 performs the processes from steps S2001 to S2006 described below. The processes of steps S2001, S2003, S2004, S2005, and S2006 are similar to the processes illustrated in FIG. 4 according to the first exemplary embodiment. In step S2002a, the host PC 200 extracts the character portion from the input image data to generate the character data. According to the present exemplary embodiment, the host PC 200 performs the processes of steps S2003 to S2004 with respect to drawing data including both the character portion and the color image portion drawn in step S2001. The printer 100 then performs the processes of steps S1001 to S1009. The processes performed by the printer 100 are similar to the processes described according to the first exemplary embodiment.

An example of the process performed in step S2002a will be described in detail below with reference to the flowchart illustrated in FIG. 21. In step S2002a1, the host PC 200 sets the processing start pixel and the processing end pixel in the input image page buffer. In step S2002a1, the host PC 200 determines whether the end pixel has been reached and that there are no other pixels to be processed. If there is no more pixel to be processed (NO in step S2002a2), the process ends. If there is any more pixel to be processed (YES in step S2002a2), the process proceeds to step S2002a3. In step S2002a3, the host PC 200 determines whether the attribute value of the pixel to be processed is the character attribute. If the pixel is not of the character attribute (NO in step S2002a3), the process returns to step S2002a2. If the pixel is of the character attribute (YES in step S2002a3), the process proceeds to step S2002a4. In step S2002a4, the host PC 200 copies to the character image page buffer the character pixel value in the input image page buffer. The process then returns to step S2002a2 to process the subsequent pixel. According to the first exemplary embodiment, the input image page buffer, the color image page buffer, and the character image page buffer are used. In contrast, according to the present exemplary embodiment, the color image page buffer is not necessary. As a result, if the input image page buffer and the character image page buffer are stored as 24 bits per one pixel and one bit per one pixel, respectively, a use memory can be reduced to approximately ½ as compared to the first exemplary embodiment.

Further, the host PC 200 can perform the processes of step S2003 and step S2002a at the same time. FIG. 22 is a flowchart illustrating that the processes of step S2003 and step S2002a can be performed at the same time. The processes of steps S200301 to S200308 are similar to the processes illustrated in FIG. 15. In step S200305, the host PC 200 determines whether the pixel to be reduction-processed is a character attribute pixel. If the pixel is of the character attribute (YES in step S200305), the process proceeds to step S200309. In step S200309, the host PC 200 copies the character pixel value to the character image page buffer. According to the first exemplary embodiment, the character portion and the color portion in the input image are separated. The pixels are then accessed twice as many times as the total number of pixels in the input image to perform low-resolution processing of the color image. However, by performing the above-described method, the input image is accessed only once, and the processing amount with respect to accessing the pixel becomes ½ as compared to the first exemplary embodiment. As a result, the processing amount of the entire system is decreased. In particular, the present exemplary embodiment is effective when processing a high-resolution input image.

The above-describe method according to the present exemplary embodiment can be applied to the method described according to the third exemplary embodiment by adding step S200309 illustrated in FIG. 22 before and after step S200317 illustrated in FIG. 16. Further, when the character page buffer and the color image page buffer are separated and the color image page buffer is reduction-processed, the ratio of the character pixel is set to the pixel value of the character portion, and reduction processing is performed by including the character portion. As a result, if a character resolution of the input image is low so that jaggies appear in the character, the jaggies can be reduced. Furthermore, when the characters are reduction-processed as a color image, the character portion becomes blurred, and the jaggies can be reduced by combining with the character print data generated from the character page buffer. However, if the character portion is reduction-processed at the same rate as the color image portion, the characters become excessively blurred. To solve such a problem, the ratio of the character pixel is set to the pixel value of the character portion, so that ink bleeding with respect to the color image portion can be controlled, and blurring which is appropriate for cancelling the jaggies can be obtained. As described above, when the character resolution of the input image is low, the jaggies in the character portion can be decreased while reducing the data amount and maintaining high character quality level.

Reduction processing with respect to the image data corresponding to the color image portion according to the above-described exemplary embodiments can be realized by other methods. In such a case, it is essential to control the pixel value of the character attribute pixel so that the average value of the pixels to be reduction-processed becomes close to the average value of the pixel values other than the character portion pixel to be reduction-processed. According to the first exemplary embodiment, such control is realized by excluding the character attribute pixels from the calculation. According to the third exemplary embodiment, such control is realized by replacing the pixel value of the character portion among the pixels to be reduction-processed, or lowering the ratio of the character pixel. As a result, when the color image page buffer is reduction-processed, the image degradation in which there is a change in the color of the color image surrounding the character image can be prevented while reducing the data amount and preventing the character quality level from becoming lowered.

Figure 18A:
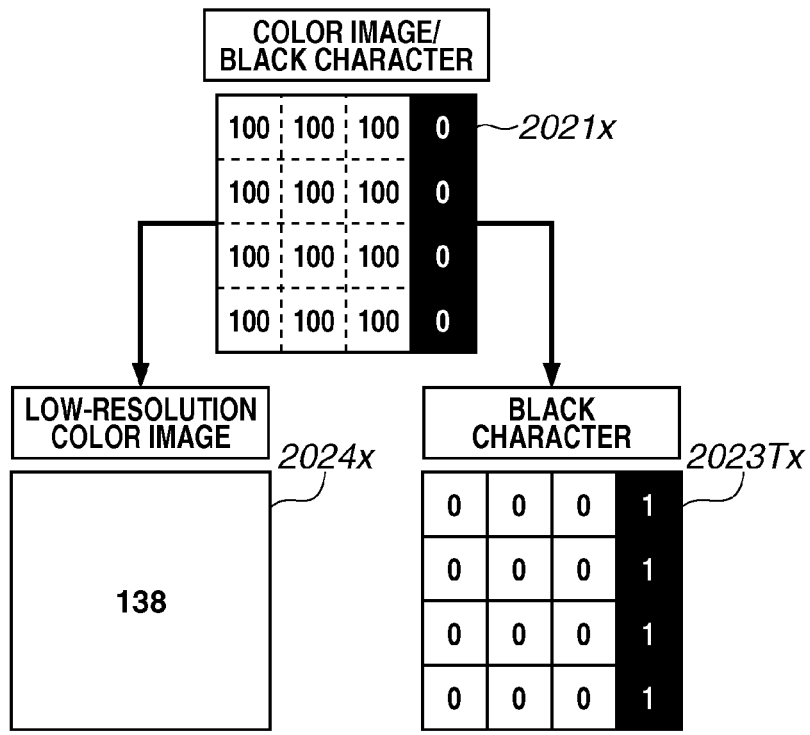
FIGS. 18A, 18B, and 18C illustrate results of low-resolution processing.
Figure 18B:
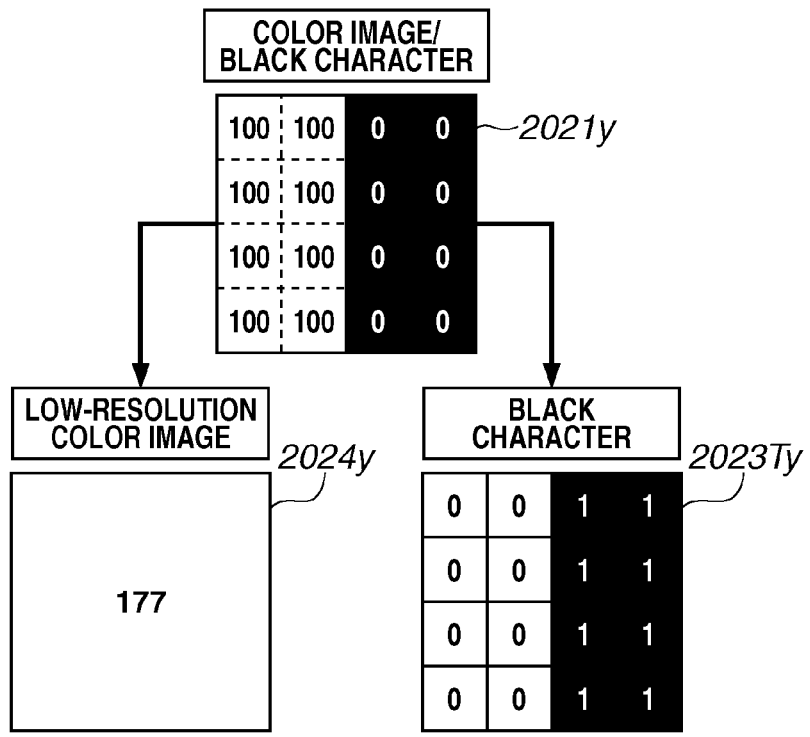
Figure 18C:
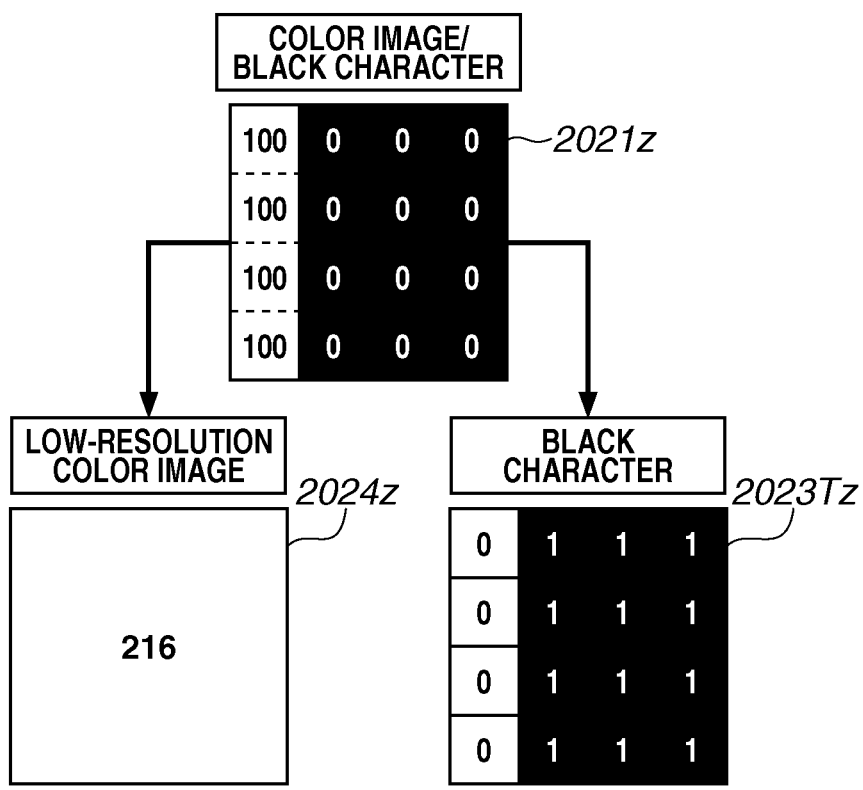
Figure 19:
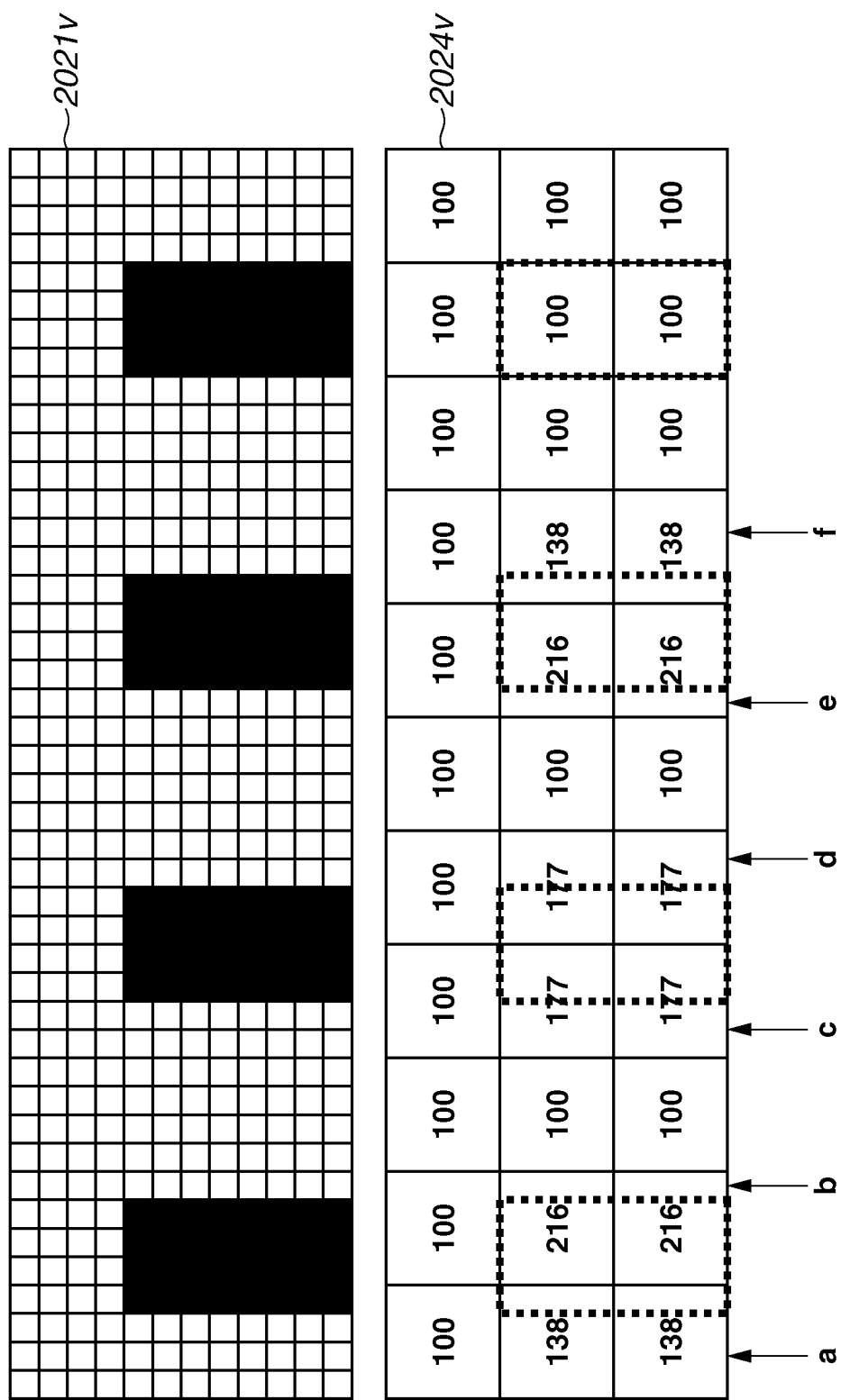
FIG. 19 illustrates a result of low-resolution processing on a periodic character portion.

The change in the color of the color image surrounding the character image in the case where the color image is 600 dpi and the black character is 2400 dpi will be described below with reference to FIGS. 18A, 18B, and 18C. FIG. 18A illustrates a case where there are four black character pixels at 2400 dpi. FIG. 18B illustrates a case where there are eight black character pixels at 2400 dpi. FIG. 18C illustrates a case where there are 12 black character pixels at 2400 dpi. The value of the low-resolution color image portion for each case is 138, 177, and 216, respectively. Further, FIG. 19 illustrates low-resolution color image values surrounding periodic black characters in which the color image is 600 dpi and the black character is 2400 dpi. Referring to FIG. 19, the black character pixel region is of four-pixel width at 2400 dpi, and is arranged at equal distances between which there are seven color pixels. However, the low-resolution color pixel values surrounding the black character greatly change, from 138, 216, 100, 177, 177, 100, 216, 138, 100, to 100. Further, in the inkjet printer, low-resolution color pixels a, b, c, d, e, and f are of light colors. The low-resolution color pixels b and e which are particularly light-colored, have low pixel density and are greatly affected by the ink bleeding. If the low-resolution color pixel is generated from one type of color ink, the effect of ink bleeding is relatively small. However, if the low-resolution color pixel is generated from two or more types of color ink, and permeability of the color ink on a printing sheet surface is different between the color inks, the difference between the permeability becomes noticeable. Thus, the colors of the low-resolution color pixels a, b, c, d, e, and f adjacent to the character change due to the difference in the permeability and become visible, in addition to becoming light. According to the exemplary embodiments of the present disclosure, color unevenness in the color image surrounding the character portion can be reduced.

According to the above-described exemplary embodiments, low-resolution processing is performed by setting as the value of each pixel in the print data after reduction the average value of the pixel values of a plurality of pixels in the input image data. However, the method is not limited thereto, and other examples of low-resolution processing will be described below. A nearest neighbor method directly uses the pixel value of the input image at which the reduction-processed pixel is positioned. An average pixel method obtains the average value by weighting using the area of the pixels in the reduction-processed image occupying the pixels of the input image. A linear interpolation method (i.e., a bilinear method) uses the two by two pixels surrounding the pixel in the input image where the reduction-processed pixel is positioned, and calculates the average value by applying a weight which is proportional to nearness. A bicubic convolution interpolation method uses four by four pixels surrounding the pixel in the input image in which the reduction-processed pixel is positioned, forms a curve by a cubic equation which passes through the pixel values to obtain the pixel value after reduction.

According to the above-described exemplary embodiments, determination of whether a pixel is of a "character attribute" or a "color pixel attribute" is performed. However, other conditions may also be employed. For example a "color pixel of a single color ink" and a "color pixel of a plurality of colors of ink" are processed at different resolutions. As a result, the character formed of a single color ink can be formed into a high-resolution image while reducing color misregistration. In such a case, the conditions for determining whether a pixel is a color pixel of a single color ink becomes as follows. The object to be drawn is not a bitmap image, and one of the R, G, and B values of the color of the object to be drawn is 0 and the other values are 255. If R=0 and G=B=255, the image is formed by only the cyan ink. If G=0 and R=B=255, the image is formed by only the magenta ink. If B=0 and R=G=255, the image is formed by only the yellow ink. In such a case, the process similar to that performed with respect to the black character is applied on each of the single color ink character data, and the result is combined with the color image data to output. By performing such a process, high-definition characters can be similarly realized for the single color ink characters in addition to the black character. Further, the determination may be performed using the ink amount after converting the RGB value to the CMYK value to be actually printed, without performing determination using the RGB value.

Furthermore, according to the above-described exemplary embodiments, the character attribute is determined based on a condition of whether the object to be drawn is a bitmap image. However, the following conditions may also be used.

the drawing object is a character object
    the drawing object is a vector drawing object
    the drawing object is a one-bit binary data bitmap object
    a rendering intent in the PDF format is Colorimetric By using the above-described conditions, the transfer data amount and the processing amount in the printer can both be reduced while maintaining the printing quality level of the characters.

According to the above-described exemplary embodiments, if R=G=B=0, the character is determined as the black character. However, if a character of an achromatic color is used, such a character may be determined based on the condition R=G=B. In such a case, the pixel value of the black character image buffer becomes eight-bit data. By employing such a method, high-resolution printing can also be realized for gray characters, and the data can be reduction-processed to ⅓ of the RGB 24-bit data. Further, the exemplary embodiments of the present disclosure are applicable to the case where high-resolution printing is to be performed for a specific ink color other than the K ink.

Furthermore, according to the above-described exemplary embodiments, the full-line type printing apparatus is used. However, the exemplary embodiments of the present disclosure are not limited thereto, and may be applied to a serial type printing apparatus which scans and prints with the printing head or a scanner in a direction perpendicular to a conveying direction of the printing medium. Moreover, one printing head may be configured to discharge ink droplets of a plurality of colors, and the nozzle arrays corresponding to the ink droplets of a plurality of colors may be arranged on one discharge substrate. Further, the printing apparatus may use a nozzle which can discharge ink droplets of a plurality of sizes.

According to the exemplary embodiments of the present disclosure, the value of each pixel in the print data which is of lower resolution as compared to that of the input image data is determined, based on the value of each pixel in the input image data and the information indicating the attribute of each pixel. As a result, the data amount and the processing amount can be reduced while preventing the image degradation to be generated at the boundary between the color image portion indicating the image attribute and the character image portion.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-018507 filed Feb. 1, 2013, which is hereby incorporated by reference herein in its entirety.

What is claimed is:

1. An image processing method comprising:
    obtaining input printing data that includes respective values for a plurality of pixels, wherein the input printing data includes image pixel data and character pixel data;
    identifying image pixels in the plurality of pixels in the input printing data;
    identifying character pixels in the plurality of pixels in the input printing data;
    selecting a first group of pixels in the input printing data, wherein the first group of pixels includes two or more image pixels and one or more character pixels, and wherein the first group of pixels is located at a first area in the plurality of pixels;
    generating a value for a first target pixel corresponding to the entire first area by generating an average value of the respective values of the two or more image pixels in the first group of pixels without using the respective values of any of the one or more character pixels in the first group of pixels, thereby generating reduced-resolution image pixel data;
    generating values indicating characters for second target pixels corresponding to the one or more character pixels in the first group of pixels and generating values for not indicating characters for third target pixels corresponding to an area of the two or more image pixels in the first group of pixels, wherein the values indicating characters and the values for not indicating characters are represented by fewer bits than the respective values of the plurality of pixel in the input printing data, thereby generating reduced-gradation-level character pixel data for a group of the second target pixels and the third target pixels corresponding to the entire first area,
    wherein a resolution of the reduced-gradation-level character pixel data is identical to a resolution of the input printing data, and
    wherein each of an area of the first target pixel in the reduced-resolution image pixel data and an area of the group of the second and third target pixels in the reduced-gradation-level character pixel data coincides with the first area in the plurality of pixels in the input printing data;
    generating first dot data based on the reduced-resolution image pixel data;
    generating second dot data based on the reduced-gradation-level character pixel data; and
    generating image print data by combining the first dot data and the second dot data.

2. The image processing method according to claim 1, wherein the first group of pixels is contiguous.

3. The image processing method according to claim 1, wherein a shape of the first target pixel and a shape of the group of the second and third target pixels are identical to a shape of the first group of pixels.

4. The image processing method according to claim 1, further comprising:
    selecting a second group of pixels in the plurality of pixels, wherein the second group of pixels includes two or more image pixels and one or more character pixels, and wherein the second group of pixels is located in a second area that does not overlap the first area in the plurality of pixels; and
    generating a value for a fourth target pixel corresponding to the entire second area by generating an average value of the respective values of the two or more image pixels in the second group of pixels without using the respective values of any of the one or more character pixels in the second group of pixels,
    wherein the reduced-resolution image pixel data includes the value of the fourth target pixel.

5. The image processing method according to claim 1,
wherein a number of gradation levels of the generated first dot data is greater than a number of gradation levels of the second dot data, and
wherein a resolution of the first dot data is identical to a resolution of the second dot data.

6. The image processing method according to claim 1, further comprising:
compressing the reduced-resolution image pixel data and the reduced-gradation-level character pixel data; and
decompressing the compressed reduced-resolution image pixel data and the compressed reduced-gradation-level character pixel data,
wherein the first dot data is generated based on the decompressed reduced-resolution image pixel data and the second dot data is generated based on the decompressed reduced-gradation-level character pixel data.

7. The image processing method according to claim 1, further comprising applying ink to a printing medium based on the image print data.

8. The image processing method according to claim 6, wherein the reduced-resolution image pixel data is compressed using lossy compression, and wherein the reduced-gradation-level character pixel data is compressed using lossless compression.

9. An image processing apparatus comprising:
a memory; and
one or more processors that are coupled to the memory and that are configured to cause the image processing apparatus to
obtain input printing data that includes respective values for a plurality of pixels, wherein the input printing data includes image pixel data and character pixel data;
identify image pixels in the plurality of pixels in the input printing data;
identify character pixels in the plurality of pixels in the input printing data;
select a first group of pixels in the input printing data, wherein the first group of pixels includes two or more image pixels and one or more character pixels, and wherein the first group of pixels is located at a first area in the plurality of pixels;
generate a value for a first target pixel corresponding to the entire first area by generating an average value of the respective values of the two or more image pixels in the first group of pixels without using the respective values of any of the one or more character pixels in the first group of pixels, thereby generating reduced-resolution image pixel data;
generate values indicating characters for second target pixels corresponding to the one or more character pixels in the first group of pixels and generate values for not indicating characters for third target pixels corresponding to an area of the two or more image pixels in the first group of pixels, wherein the values indicating characters and the values for not indicating characters are represented by fewer bits than the respective values of the plurality of pixel in the input printing data, thereby generating reduced-gradation-level character pixel data for a group of the second target pixels and the third target pixels corresponding to the entire first area,
wherein a resolution of the reduced-gradation-level character pixel data is identical to a resolution of the input printing data, and
wherein each of a position of the first target pixel in the reduced-resolution image pixel data and a position of the group of the second and third target pixels in the reduced-gradation-level character pixel data coincides with the first position of the first group of pixels in the input printing data;
send the generated reduced-resolution image pixel data and the generated reduced-gradation-level character pixel data to a printer;
wherein first dot data is generated based on the reduced-resolution image pixel data, second dot data is generated based on the reduced-gradation-level character pixel data, and image print data is generated by combining the first dot data and the second dot data, in the printer.

10. The image processing apparatus according to claim 9, wherein the first group of pixels is contiguous.

11. The image processing apparatus according to claim 9,
wherein a number of gradation levels of the first dot data is greater than a number of gradation levels of the second dot data, and
wherein a resolution of the first dot data is identical to a resolution of the second dot data.

12. The image processing apparatus according to claim 9, wherein the one or more processors are further configured to cause the image processing apparatus to
compress the reduced-resolution image pixel data using lossy compression; and
compress the reduced-gradation-level character pixel data using lossless compression,
wherein the compressed reduced-resolution image pixel data and the compressed reduced-gradation-level character pixel data are decompressed in the printer,
wherein the first dot data is generated based on the decompressed reduced-resolution image pixel data and the second dot data is generated based on the decompressed reduced-gradation-level character pixel data in the printer.

13. The image processing apparatus according to claim 9, wherein the one or more processors are further configured to cause the image processing apparatus to send the image print data to a printer.

14. The image processing method according to claim 1, further comprising sending the image print data to a printer.

15. The image processing method according to claim 5, wherein the number of gradation levels of the first dot data is greater than a number of pixels included in the first group of pixels by one.

16. The image processing method according to claim 1, wherein a number of gradation levels of the second dot data is identical to a number of gradation levels of the reduced-gradation-level character pixel data.

17. The image processing method according to claim 5, wherein the number of gradation levels of the second dot data is two.

18. The image processing method according to claim 1, wherein the image print data is generated by calculating a logical sum of pixels in the first dot data and pixels in the second dot data, the pixels in the first dot data and the pixels in the second dot data corresponding to each other.

19. The image processing method according to claim 1, wherein an area in the first dot data corresponding to the first area includes dot areas for forming dots, a number of which is same as a number of pixels in the first group of pixels.

20. The image processing method according to claim 1, wherein the two or more image pixels are adjacent to the one or more character pixels.

21. The image processing apparatus according to claim 11, wherein number of gradation levels of the generated first dot data is greater than a number of pixels included in the first group of pixels by one.

22. The image processing apparatus according to claim 9, wherein a number of gradation levels of the second dot data is identical to a number of gradation levels of the reduced-gradation-level character pixel data.

23. The image processing apparatus according to claim 11, wherein the number of gradation levels of the second dot data is two.

24. The image processing apparatus according to claim 9, wherein the image print data is generated by calculating a logical sum of pixels in the first dot data and pixels in the second dot data, the pixels in the first dot data and the pixels in the second dot data corresponding to each other.

25. The image processing apparatus according to claim 9, wherein an area in the first dot data corresponding to the first area includes dot areas for forming dots, a number of which is same as a number of pixels in the first group of pixels.

26. The image processing apparatus according to claim 9, wherein the two or more image pixels are adjacent to the one or more character pixels.

27. An image processing method comprising:
   obtaining input printing data that includes respective values for a plurality of pixels, wherein the input printing data includes image pixel data and character pixel data;
   identifying image pixels in the plurality of pixels in the input printing data;
   identifying character pixels in the plurality of pixels in the input printing data;
   selecting a first group of pixels in the input printing data, wherein the first group of pixels includes two or more image pixels and one or more character pixels, wherein the first group of pixels is located at a first area in the plurality of pixels, and wherein the two or more image pixels are adjacent to the one or more character pixels;
   generating a value for a first target pixel corresponding to the entire first area by generating an average value of the respective values of the two or more image pixels in the first group of pixels without using the respective values of any of the one or more character pixels in the first group of pixels, thereby generating reduced-resolution image pixel data;
   generating values indicating characters for second target pixels corresponding to the one or more character pixels in the first group of pixels and generating values for not indicating characters for third target pixels corresponding to an area of the two or more image pixels in the first group of pixels, wherein the values indicating characters and the values for not indicating characters are represented by fewer bits than the respective values of the plurality of pixel in the input printing data thereby generating reduced-gradation-level character pixel data for a group of the second target pixels and the third target pixels corresponding to the entire first area,
   wherein a resolution of the reduced-gradation-level character pixel data is identical to a resolution of the input printing data, and
   wherein each of an area of the first target pixel in the reduced-resolution image pixel data and an area of the group of the second target pixels and the third target pixels in the reduced-gradation-level character pixel data coincides with the first area in the plurality of pixels in the input printing data;
   generating first dot data based on the reduced-resolution image pixel data, wherein an area in the first dot data corresponding to the first area includes dot areas for forming dots, a number of which is identical to a number of pixels in the first group of pixels;
   generating second dot data based on the reduced-gradation-level character pixel data, wherein a number of gradation levels of the generated first dot data is greater than a number of gradation levels of the second dot data, and wherein a resolution of the first dot data is identical to a resolution of the second dot data; and
   generating image print data by combining the first dot data and the second dot data.

\* \* \* \* \*